United States Patent [19]

White et al.

[11] Patent Number: 5,586,066
[45] Date of Patent: Dec. 17, 1996

[54] SURVEILLANCE OF INDUSTRIAL PROCESSES WITH CORRELATED PARAMETERS

[75] Inventors: Andrew M. White, Skokie; Kenny C. Gross, Bolingbrook, both of Ill.; William L. Kubic, Sante Fe, N.M.; Roald A. Wigeland, Olympia Fields, Ill.

[73] Assignee: Arch Development Corporation, Chicago, Ill.

[21] Appl. No.: 255,586

[22] Filed: Jun. 8, 1994

[51] Int. Cl.⁶ .................................................. G06G 7/19
[52] U.S. Cl. .................. 364/576; 364/550; 364/551.02; 364/554; 364/185; 395/914; 395/915
[58] Field of Search ....................... 395/914, 915; 376/215–217; 364/576, 550, 551.02, 554, 492, 185, 184; 340/506, 507, 521, 522, 511

[56] References Cited

U.S. PATENT DOCUMENTS

| | | | |
|---|---|---|---|
| 3,710,082 | 1/1973 | Sloane et al. | 235/151 |
| 3,848,115 | 11/1974 | Sloane et al. | 235/151 |
| 4,133,039 | 1/1979 | Eichenlaub | 364/554 |
| 4,215,340 | 7/1980 | Lejon | 340/507 |
| 4,292,129 | 9/1981 | Barry | 176/24 |
| 4,399,095 | 6/1983 | Morris | 376/216 |
| 4,435,751 | 3/1984 | Hori et al. | 364/574 |
| 4,577,235 | 3/1986 | Kannapel et al. | 358/280 |
| 4,598,271 | 7/1986 | Wägli et al. | 340/511 |
| 4,611,197 | 9/1986 | Sansky | 340/552 |
| 4,621,334 | 11/1986 | Garcia | 364/550 |
| 4,627,954 | 12/1986 | Leroy et al. | 370/216 |
| 4,658,245 | 4/1987 | Dye et al. | 340/683 |
| 4,697,170 | 9/1987 | Hoekman | 340/551 |
| 4,707,687 | 11/1987 | Thomas et al. | 340/680 |
| 4,707,688 | 11/1987 | Thomas | 340/680 |
| 4,744,242 | 5/1988 | Anderson et al. | 73/204 |
| 4,758,964 | 7/1988 | Bittner et al. | 364/508 |
| 4,772,445 | 9/1988 | Nasrallah et al. | 376/245 |
| 4,783,307 | 11/1988 | Galligan et al. | 376/217 |
| 4,816,208 | 3/1989 | Woods et al. | 376/259 |
| 4,849,741 | 7/1989 | Thomas | 340/683 |
| 4,923,117 | 5/1990 | Adams et al. | 236/94 |
| 4,977,390 | 12/1990 | Saylor et al. | 340/521 |
| 4,991,216 | 2/1991 | Fujii et al. | 381/41 |
| 5,023,045 | 6/1991 | Watanabe et al. | 326/215 |
| 5,083,571 | 1/1992 | Prichey | 128/731 |
| 5,103,402 | 4/1992 | Morton et al. | 364/485 |
| 5,140,858 | 8/1992 | Nishimoto et al. | 73/587 |
| 5,223,207 | 6/1993 | Gross et al. | 376/216 |
| 5,410,492 | 4/1995 | Gross et al. | 364/576 |

OTHER PUBLICATIONS

"Spectrum–Transformed Sequential Testing Method for Signal Validation Applications," Gross, et al., *8th Power Plant Dynamics, Control & Testing Symp.*, Knoxville, TN, May 1992.

"Sensor failure detection in dynamical systems by Kalman filtering methodology," Turkcan, Netherlands Energy Research Foundation, The Netherlands & O. Ciftcioglu, Istanbul Technical University, Turkey, Dynamics and Control in Nuclear Power Stations, BNES, London, 1991, pp. 133–139.

(List continued on next page.)

Primary Examiner—Ellis B. Ramirez
Assistant Examiner—Hal D. Wachsman
Attorney, Agent, or Firm—Reinhart, Boerner, Van Deuren, Norris & Rieselbach, S.C.

[57] ABSTRACT

A system and method for surveillance of an industrial process. The system and method includes a plurality of sensors monitoring industrial process parameters, devices to convert the sensed data to computer compatible information and a computer which executes computer software directed to analyzing the sensor data to discern statistically reliable alarm conditions. The computer software is executed to remove serial correlation information and then calculate Mahalanobis distribution data to carry out a probability ratio test to determine alarm conditions.

27 Claims, 9 Drawing Sheets

OTHER PUBLICATIONS

"Plant Monitoring and Signal Validation at HFIR," Mullens, Oak Ridge National Laboratory, Instrumentation & Controls Div., Oak Ridge, TN, pp. 2.01–2.12, May 19–24, 1991.

"An Expert System for Sensor Data Validation & Malfunction Detection," Hashami, et al., presented at American Nuclear Society Topical Meeting, Aug. 31–Sep. 2, 1987, Snowbird, Utah.

"On–Line Test of Signal Validation Software on the Lobi–MOD2 Facility in Ispra, Italy,"Prock et al., Nuclear Technology, vol. 97, Jan. 1992, pp. 52–62.

"Spike Energy in Fault Analysis/Machine Condition Monitoring," Shea et al.

"Loose Part Monitor Sensor Validation, Impact Detection, and Characterization," Allen, Nuclear Power Journal, May–Jun. 1989, pp. 80,82,84–91.

"Reactor Operations" Artificial Intelligence Applications to Improve Nuclear Plant Operations, Quallis, et al, 1988 Winter Meeting, Washington, D.C., International Conference on Nuclear Fission Fifty Years of Process in Energy Security, Oct. 1988.

"Control and Instrumentation," Upadhyaya, Nuclear Safety, vol. 26, No. 1, Jan.–Feb. 1985, pp. 32–42.

"A Methodlogy for the Design and Analysis of a Sensor Failure Detection Network," Chou, et al, Nuclear Technology, vol. 101, Jan. 1993, pp. 101–109.

"Validation of Smart Sensor Technologies for Instrument Calibration Reduction in Nuclear Power Plants," Hashemain, et al, NUREG/CR–5903, Jan., 1993, pp. i–ix and 1–154.

"Intelligent Interfaces to Expert Systems Illustrated by a Programmable Signal Validation System," Frogner, *Expert Systems Applications for the Electric Power Industry*, vol. 1, 1991, pp. 243–256.

"Validation of Critical Signals for the Safety Parameter Display System," NP–5066M, Research Project 2292–1, Final Report Apr. 1987.

"Fault–Tolerant Plant Operations Systems I: A Tutorial on Concepts," Dove (NASA), p. 370–374, Jun. 9–13, 1985.

"Fault–Tolerant Plant Operations Systems II: Reports on Experience in Implementation," Blancaflor, et al, pp. 375–379, Jun. 9–13, 1985.

"Microcomputer–Based Fault Detection Using Redundant Sensors," Polenta, et al, IEEE Transactions on Nuclear Science, vol. 24, No. 5, Sep.–Oct. 1988, pp. 905–912.

"Construction and Evaluation of Fault Detection Network for Signal Validation," Ning et al, IEEE Transactions on Nuclear Science, vol. 39, No. 4, 1992, pp. 943–947.

"Early Fault Detection and Diagnosis in Finnish Nuclear Power Plants," Eklund, et al, Progress in Nuclear Energy, 1988, vol. 21, pp. 479–487.

"Fault Detection Method Using Power Supply Spectrum Analysis," Electronics Letters 27th Sep. 1990 vol. 26, No. 28.

"Process Hypercube Comparison for Signal Validation, "Holbert, IEEE Transactions on Nuclear Science, vol. 38. No. 2, Apr. 1991, pp. 803–811.

"Algorithm–Based Fault Detection for Signal Processing Applications," Reddy et al, IEEE Transactions on Computers, vol. 39, No. 10, Oct. 1990, pp. 1304–1308.

"Signal Validation Techniques and Power Plant Applications," Divakaruni, et al, Progress in Nuclear Energy, vol. 22, No. 3, pp. 181–213, 1988.

"Power Signal Validation for Taiwan Research Reactor," Lee, et al, Nuclear Technology, vol. 84, Jan. 1989, pp. 7–13.

"Instrument Fault Detection in a Pressurized Water Reactor Pressurizer," Clark, et al, Nulear Technology, vol. 56, Jan. 1982, pp. 23–32.

"An Integrated Signal Validation System for Nuclear Power Plants," Holbert, et al, Nuclear Technology, vol. 92, Dec 1990, pp. 411–427.

"On–Line Signal Validation and Feedback Control in a Nuclear Reactor," Ray, et al, pp. 38.01–38.09, Mar. 21, 1983.

"Signal Validation with Control Room Information–Processing Computers," Belblidia, et al, Progress in Nuclear Energy, vol. 12, No. 10, pp. 551–558, 1985.

"Expert Systems application to Plant Diagnosis and Sensor Data Validation,"Hashemi, et al, Power Plant Dynamics, Control & Testing Symposium, 6th Proceedings, Apr. 14–16, 1986, Knoxville, TN.

"An Expert System for Real–Tim Diagnostics and Control," Christie, et al, ANS Topical Meeting on Computer Applications for Nuclear Power Plan Operation and Control, Sep. 1985, pp. 671–676.

"Knowledge–Based Systems in Process Fault Diagnosis," Sudduth, Nuclear Engineering and Design, vol. 112, 1989, pp. 195–209.

"Condition Monitoring of Machinery Using Motor Current Signature Analysis (MCSA),"Kryter, Sep. 11–14, 1989.

"Sensor Fault Monitoring and Process Diagnostics," Upadhyaya, et al, Tennessee Industries Week, vol. 1, Aug. 16–18, 1989.

SURVEILLANCE OF INDUSTRIAL PROCESSES WITH CORRELATED PARAMETERS

This invention was made with Government support under Contract No. W-31-109-ENG-38 awarded by the Department of Energy. The Government has certain rights in this invention.

The present invention is related generally to a method and system for carrying out on-line surveillance of industrial processes with correlated sensor parameters. More particularly, the invention is concerned with a method and system for processing sensor data as an improved methodology over a basic SPRT approach to industrial process surveillance. Further, the invention can be used as part of an improved SPRT analysis itself.

Conventional parameter-surveillance schemes are sensitive only to gross changes in the mean value of a process or to large steps or spikes that exceed some threshold limit check. These conventional methods suffer from either large numbers of false alarms (if thresholds are set too close to normal operating levels) or a large number of missed (or delayed) alarms (if the thresholds are set too expansively). Moreover, most conventional methods cannot perceive the onset of a process disturbance or sensor deviation which gives rise to a signal below the threshold level for an alarm condition. Most methods also do not account for the relationship between a measurement by one sensor relative to another sensor measurement.

In another monitoring method, the conventional SPRT technique has found wide application as a signal validation tool in the nuclear reactor industry. The SPRT method is a pattern recognition technique which processes the stochastic components associated with physical process variables and has high sensitivity for the onset of subtle disturbances in those variables. Two features of the SPRT technique make it attractive for parameter surveillance and fault detection: (1) early annunciation of the onset of a disturbance in noisy process variables, and (2) the SPRT technique has user-specificable false alarm and missed-alarm probabilities. SPRT techniques are primarily directed to the analysis of data from paired or multiple pairs of sensors to contrast to a large number of difference process sensor data points. SPRT is also typically dependent on assumptions of the data being independent and being Gaussian distributed data.

It is, therefore, an object of the invention to provide an improved method and system for surveillance of industrial processes.

It is another object of the invention to provide a novel method and system for on-line surveillance of industrial processes with correlated parameters.

It is also an object of the invention to provide an improved method and system for evaluation of industrial process data, on-line or off-line, from unpaired sensors.

It is a further object of the invention to provide a novel method and system for performing preliminary analysis of sensor data for alarm conditions prior to data input to an SPRT system.

It is an additional object of the invention to provide an improved method and system for carrying out elimination of serial correlation information from sensors prior to performing tests for abnormal process conditions.

It is still another object of the invention to provide a novel method and system for removing serial correlation of sensor data taken in an industrial process by at least one of (a) eliminating Fourier components selectively and (b) using auto correlation structure present in the data from each of the sensors.

It is yet a further object of the invention to provide an improved method and system for processing sensor data free from serial correlation effects using calculated Mahalanobis distances.

It is also an additional object of the invention to provide a novel method and system utilizing an empirical test data distribution for deriving the likelihood of observing different Mahalanobis distances.

It is also another object of the invention to provide a novel method and system for comparing industrial process training data to on-line industrial process data by calculating comparative Mahalanobis distances for each data set.

It is still another object of the invention to provide a novel method and apparatus for statistically analyzing data from an industrial process using time averaged or skipped data to bypass slowly changing data.

It is yet a further object of the invention to provide an improved method and system using statistical information including use of a linearized variable technique (i.e., use of a variable whose behavior is, over the whole range a nonlinear behavior, but which can be modeled as many increments of linear variable responses).

It is an additional object of the invention to provide an improved method and system for isolating single bad sensors by calculating a Mahalanobis distance with the bad sensor being masked or by determining the sensor whose expected value (given the other sensor values) is furthest from the actual value.

The features of the present invention which are believed to be novel are set forth with particularity in the appended claims. The invention, together with the further objects and advantages thereof, may best be understood by reference to the following description taken in conjunction with the accompanying drawings, wherein like reference numerals identify like elements.

BRIEF DESCRIPTION OF DRAWINGS

FIG. 3B corresponds to the general box B in FIG. 2; FIG. 3C corresponds to the general box C in FIG. 2; FIG. 3D corresponds to the general box D in FIG. 2; FIG. 3E corresponds to the general box E in FIG. 2 and FIG. 3F corresponds to the general box F in FIG. 2.

DETAILED DESCRIPTION OF PREFERRED EMBODIMENTS

Figure 1:
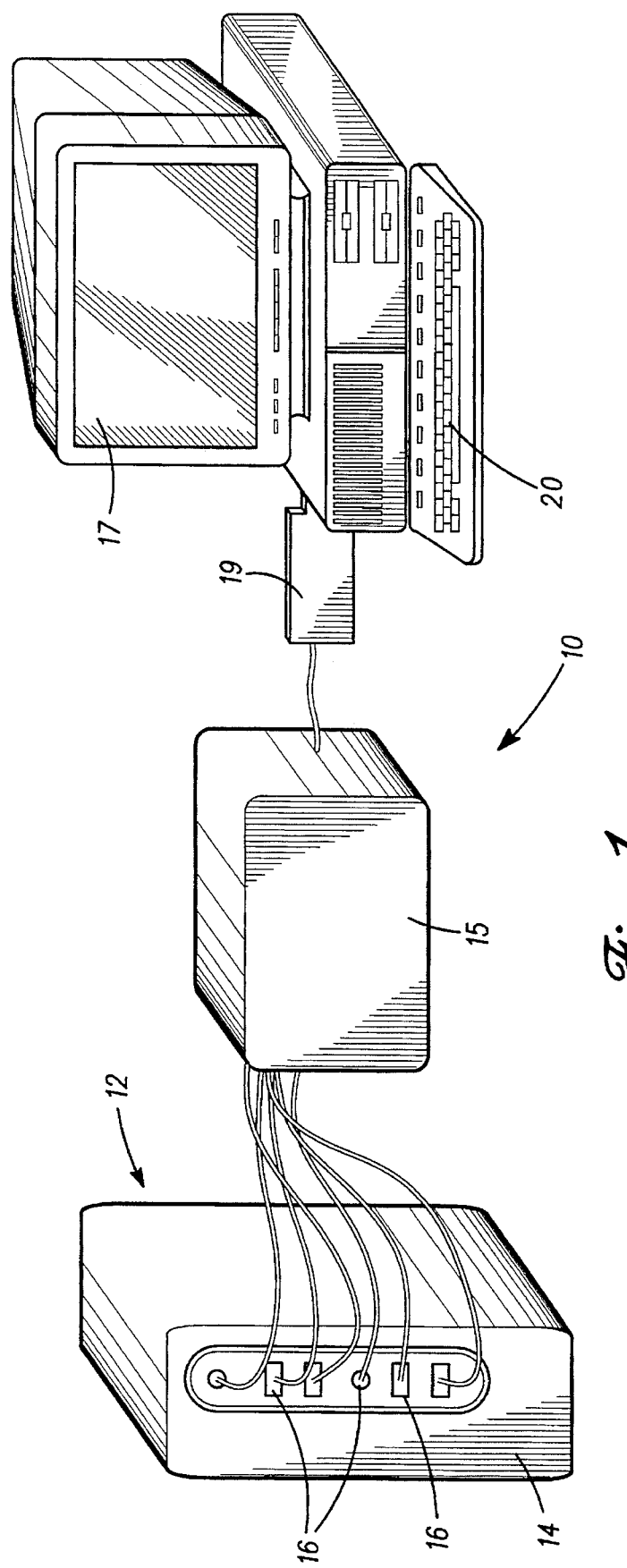
FIG. 1 shows a block flow diagram of a system for implementing an industrial process surveillance system.

A system constructed in accordance with the invention is indicated generally at 10 in FIG. 1. As shown therein, a surveillance portion 12 is performing monitoring operations on an industrial system 14 by means of a plurality of sensors 16 which can sense raw data information characteristic of a wide variety of variables, such as, temperature, flow rate, pressure, chemical composition, biomedical information, density, shaft rotational speed, electrical power level, electrical phase, electrical frequency and other such process variables.

It is typical in the industrial system 14 that a substantial degree of cross correlation exists among sensed data from the plurality of sensors 16. In many industrial processes such cross correlation arises naturally from the physics or chemistry inherent in such systems. For example, if the industrial system 14 involves fluid transport, then the flow rate, pressure drops and upstream versus downstream temperatures will all have a substantial degree of correlation. A further example for the industrial system 14 is for rotating machinery wherein the rotation of a shaft will generate a rotational speed signal which is highly correlated with the power provided to drive the machine motor. Further, both of these variables are usually correlated with radial vibration levels for the machine. If the industrial system 14 includes an array of the sensors 16 deployed to measure the same variable, there can be a high degree of correlation due to the close proximity of the various sensors 16.

The system 10 is operated by use of a conventional computer 17 executing a computer software package (SMP software package hereinafter) which is embedded in a storage medium on board the computer 17, and a copy of the best mode is attached hereto as a source code Appendix. This mode can be extended using additional methodologies described hereinafter using conventional algorithms and commercially available computer software programs. Further details will be mentioned when appropriate in later descriptions. The system 10 also includes a conventional interface DAQ board 19 and a signal conditioning module 15, e.g., a model number SCRI 1120 or 1200 made by National Instrument Corp. The DAQ board 19 and the module 15 allow the raw data information from the sensors 16 to be converted to computer data usable by the computer 17.

Figure 2:
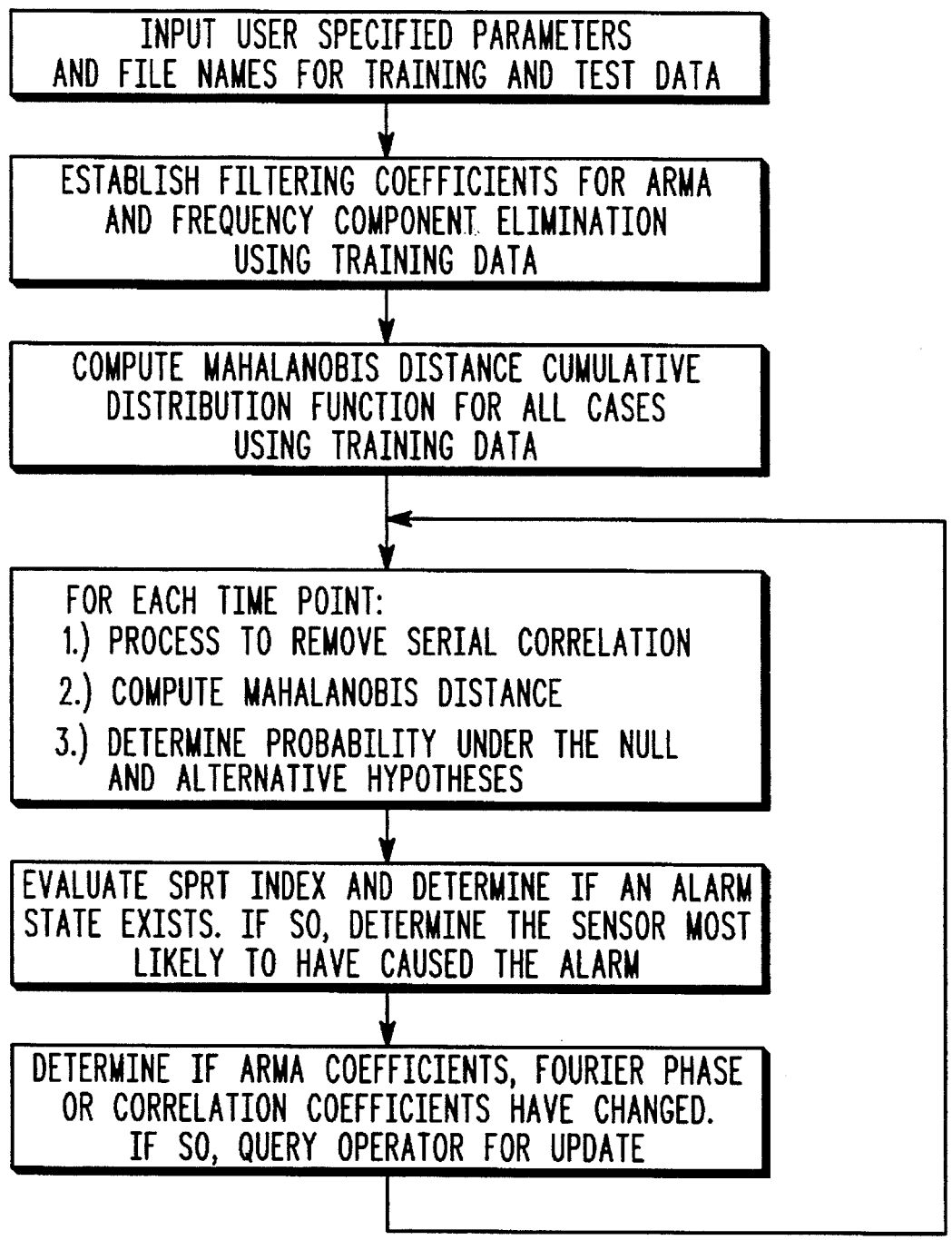
FIG. 2 illustrates a generalized block flow diagram of the data analysis performed using a surveillance system constructed in accordance with the invention.

The SMP software package generally processes computer analyzable sensor data in three stages (see FIG. 2). The first stage is concerned with elimination of serial correlation signals. Serial correlation refers to the correlation in time of signals from a particular sensor with itself. Cross correlation refers to the correlation between two sensors at the same or different times. This first stage of the processing minimizes the overall false alarm occurrence for the system 10. The serial correlation can be removed by one of two user selectable methods: (1) eliminating Fourier components (individual frequencies or bands can be removed), or (2) by using the autocorrelation structure present in the data. There is also a provision for allowing the autocorrelation and/or the power spectrum to be recalculated and compared with earlier results. The assumption that the data follow a multivariate normal distribution can be made throughout. However, even if a normal distribution does not characterize the data, the test will generally yield statistically good results. The conventional Pearson product moment correlation can be used as an estimator for the true correlation.

The second stage of processing is one in which the Mahalanobis distance (a metric) is calculated for training data (data obtained knowing all sensors are good and the process is properly functioning for the industrial system 14) for all time points after transformation to eliminate serial correlation. The cumulative distribution function ("CDF") of the Mahalanobis distance is computed, and from this distribution a probability distribution function ("PDF") can be formed. Similar distributions can be created for the multiple situations in which each individual sensor is masked from the computations and also for different regimes of segmented variables and for averages or skipped time points. A provision exists for recalculation of all distributions at later times to ensure that there has been no significant drift.

The final or third stage of processing employs a probability ratio test of the distribution data to determine if there is a sufficient evidence to annunciate a warning. This test includes as an option the capability to set the test statistic to zero whenever it becomes negative. This enhances the sensitivity of the test and is mathematically equivalent to starting a separate test at each time point.

Figure 3A:
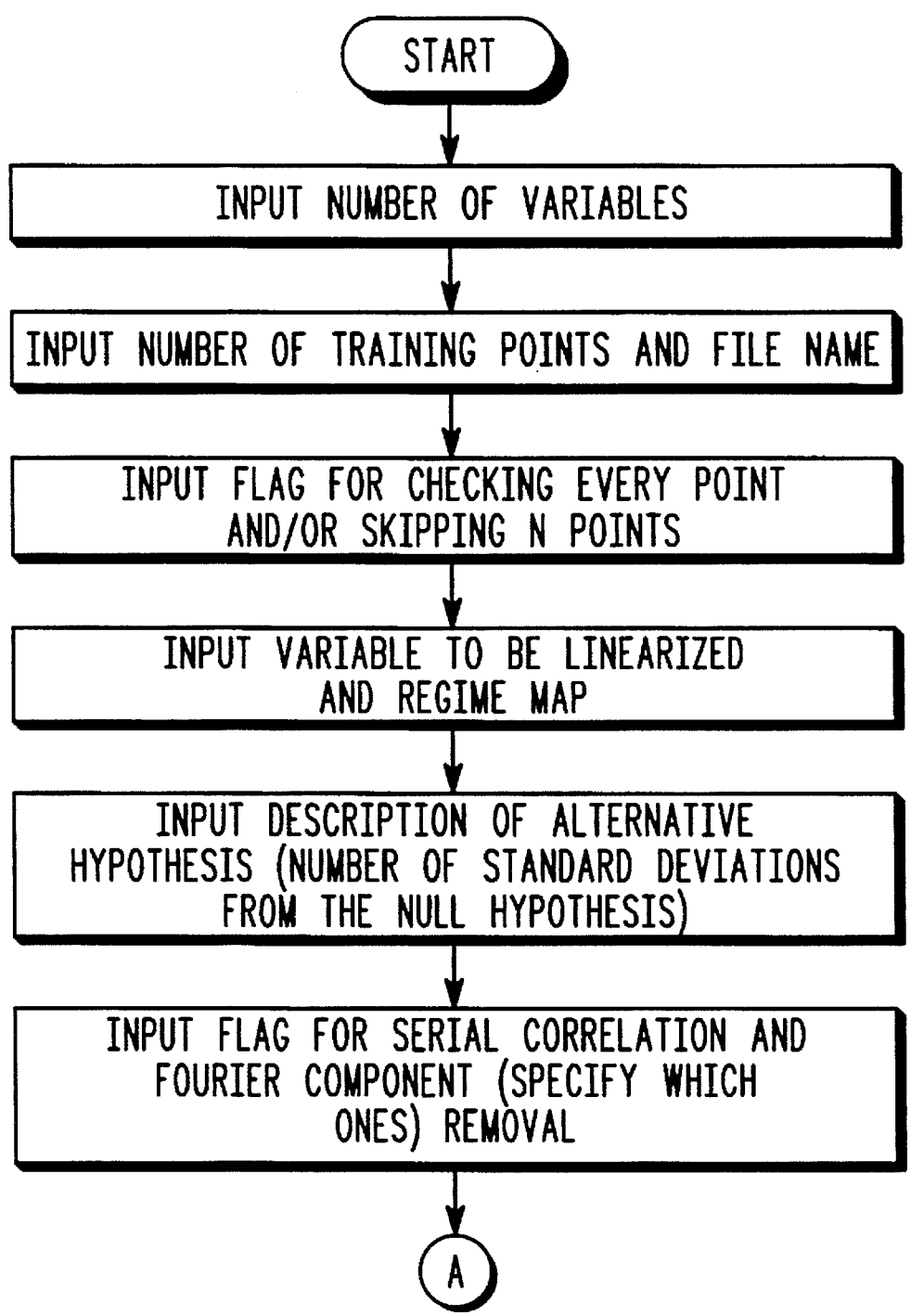
FIGS. 3A–3F encompasses a detailed block flow diagram of the analysis shown in FIG. 2 where FIG. 3A corresponds to general box A in FIG. 2.

In order to operate the system 10, as shown in FIG. 2 and in more detail in FIG. 3A, the SMP software package is used by a system operator who inputs a number of correlated variables via a conventional input device, such as a keyboard 20. The operator also can enter a desired number of process system training data points which provide a standard of reference for a properly operating form of the industrial system 14. In addition, the operator can choose to implement, or skip, the third and fourth illustrated steps in FIG. 3A. In the third optional step, selected points can be skipped or in the fourth step a set of data can be linearized as described hereinafter.

Figure 3B:
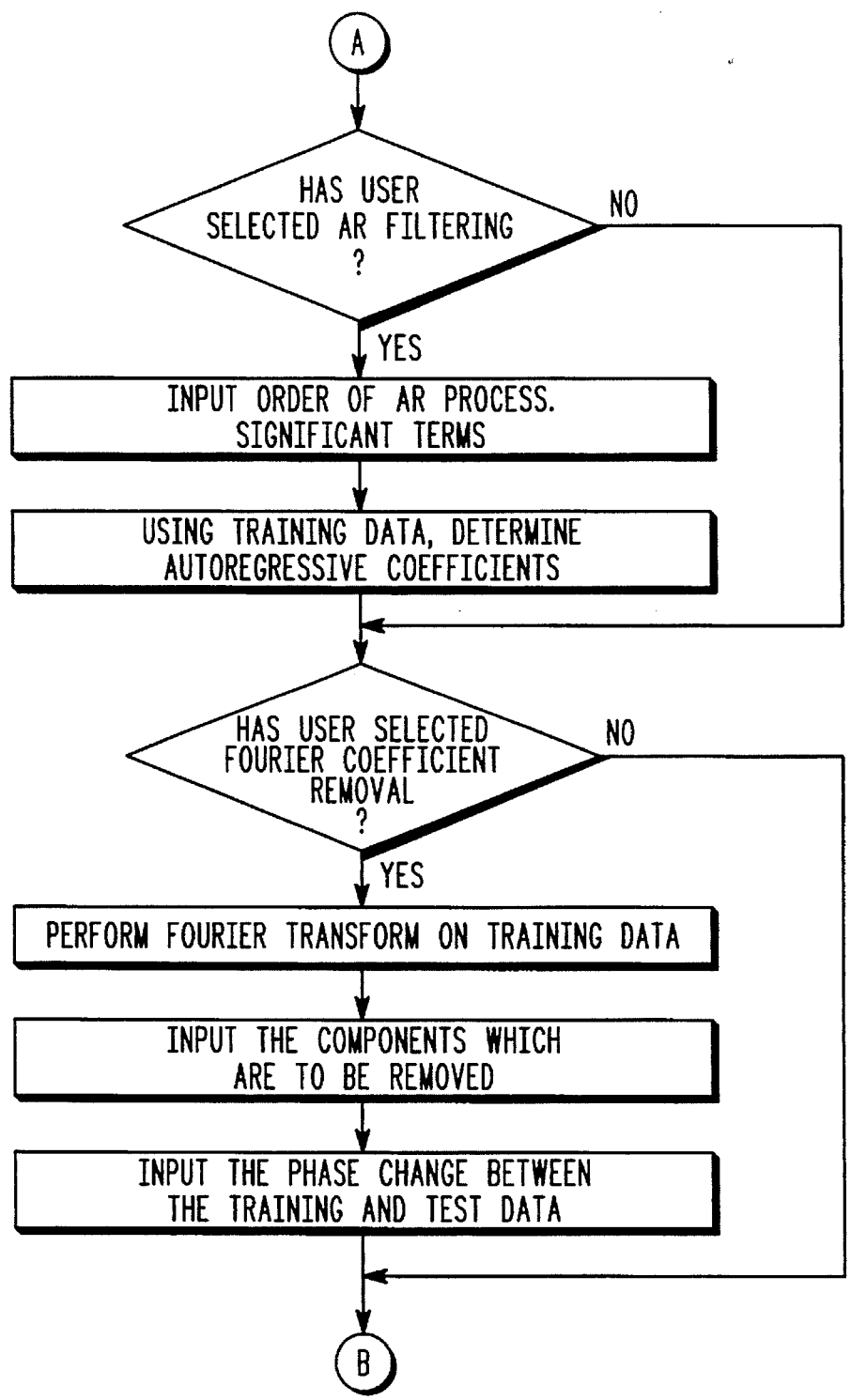

As shown in FIG. 3B, the operator then can select one of the options to implement the first stage: (a) use of Fourier filtering, (b) use of autoregressive filtering, (c) combinations of (a) and (b) and (d) no filtering. Steps (a) and (b) are therefore used for removal of any self correlation information from the sensor 16.

If the operator has selected option (a) above, a Fourier transform is performed on the data (see lower part of FIG. 3B). A fast Fourier transform ("FFT") is used to determine the amplitude, phase and power spectrum of a series of training points. Such an FFT can be easily accomplished by conventionally available computer subroutines (see Appendix). The Fourier components are those determined using the expression:

$$X_f = \sum_{t=0}^{N-1} x_t e^{2\pi i t/N}$$

where $x_t$ is the value of x at time t, and N is the total number of points. The coefficient $X_n$ is complex and because the time values are real, it is symmetric. The power at a given frequency is determined using the following:

$$P_F = \frac{|x_f|^2}{N^2}$$

where the subscript f denotes a particular frequency. The preferred SMP software package for performing FFT analysis (see Appendix) allows the user to specify a particular frequency which he wants removed. It also allows the user to specify a band within which he wants the top M powered frequencies removed (where M is an integer that is also specified by the user). The removal of self-correlation via FFT analysis occurs via simple superposition (see FIG. 3D). That is, the user of the FFT subroutine is permitted to select up to eight Fourier components for removal, and the Fourier components are removed by determining the phase and subtracting the corresponding amplitudes with the given phases from the signal. The relative phase is determined directly from knowledge of when the training data were taken and of when the sampling began for the data to be tested. If this interval is uncertain, the SMP software package recomputes the phases using the first set of actual data.

The code can be further enhanced to allow the user to run multiple tests simultaneously; this corresponds to the third item in FIG. 3A. One of these tests would consider every point while the other would consider every nth point (or the time average of N points). This would allow the code to detect gross errors which occur over large periods of time. There is little added complexity in doing this; the array storage must be modified and a simple selection or averaging routine must be added.

In addition, the code can be modified to periodically check that neither the Fourier components (i.e., the phase) nor the autoregressive coefficients have changed significantly. This corresponds to the first four items in FIG. 3F. If either has, the user is notified and is given the option to update these. Two methods are used to determine whether or not the change is significant. The first is a simple magnitude check, and the second involves the use of the distributional shape of the coefficients and an input number of standard deviations. The Fourier components and autoregressive coefficients are computed in the manner given above.

The code can be modified to ensure that the correlation matrix is periodically checked for significant changes. This corresponds to items 5 and 6 in FIG. 3F. These changes are detected using distributional knowledge (approximately chi-squared) and an input number of standard deviations. The user is notified of changes and is given the option to update the matrix. The Pearson product-moment correlation coefficients are used to estimate the true correlation coefficients.

The code can be modified to allow for two methods of determining a bad one of the sensors 16. The first is the method currently implemented in the code. This corresponds to items 2 and 4 in FIG. 3E. The second involves the use of the principal components to estimate the value of a parameter. The sensor 16 which is tagged as bad is the one whose measured value is furthest from the expected value given the other sensor readings.

Figure 3C:
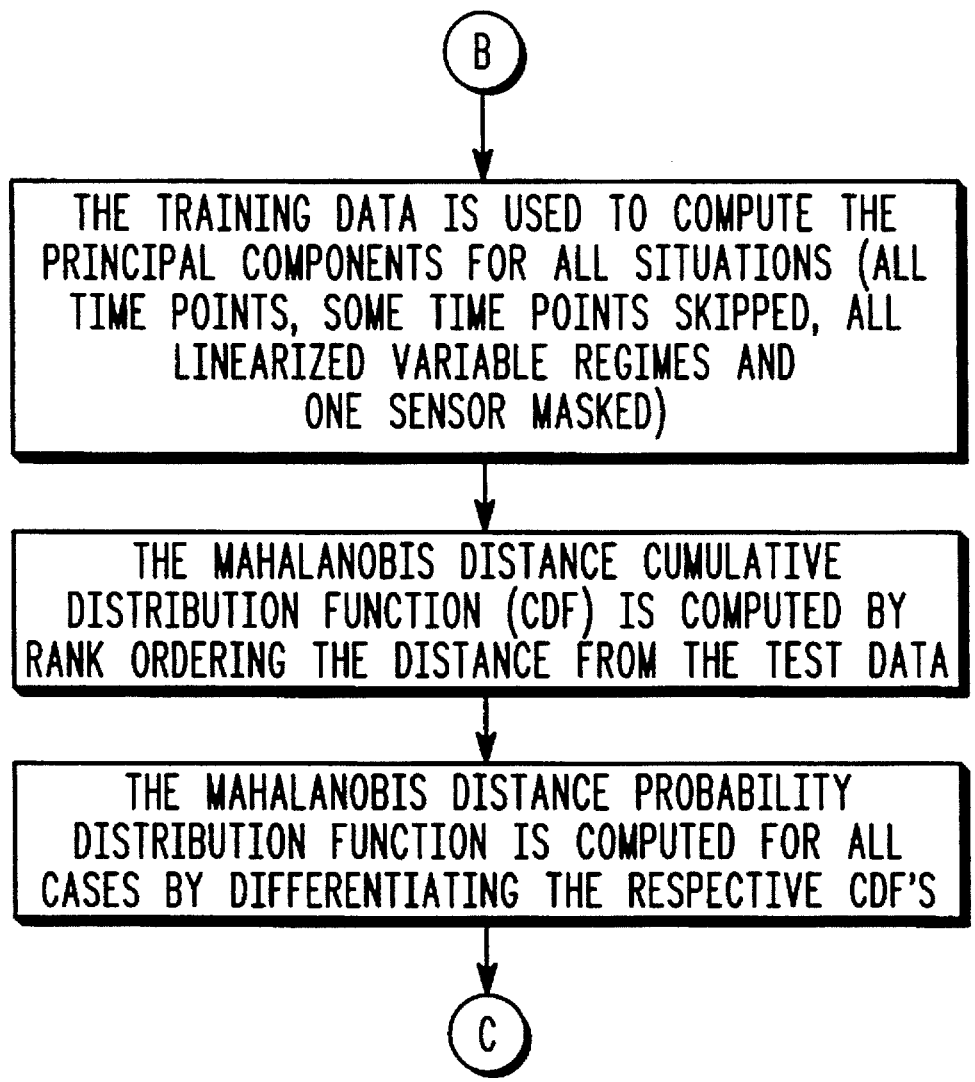

If the operator elects the autoregression method (see top of FIG. 3B), the option is available to skip selected terms to reduce the amount of storage and computation required while still including higher order terms needed. As shown in FIG. 3C, the training data is then used to establish coefficients for the desired terms in the sequence and such autocorrelation coefficients can be found using coding (see Appendix) which employs the Conventional Yule-Walker equations and well-known, commercially available subroutines from LINPACK (now LAPACK). These coefficients can be found in the following manner:

If one has a series of observations, $x_i$, the estimate of the lag "n" correlation is obtained using the following relation:

$$\rho_n = \frac{\sum_{i=1}^{N-n} (X(i+n) - \mu)(X(i) - \mu)}{(N-n)\chi_o^2}$$

where $\chi_o^2$ is the estimated variance, and, $\mu$ is the estimated mean. Using this expression, the SMP software package determines the expected value of a future observation, given the past observations. This is done using the equation $$Y(n) = X(n) - a_n^T \sum_{n-1}^{-1} X_{n-1}$$

where:

$$a_n^T = [\chi_{n-1}\chi_{n-2} \cdots \chi_2\chi_1],$$

$$\sum_{n-1}^{-1} = \begin{bmatrix} x_0 & x_1 & \cdots & x_{n-2} & x_{n-1} \\ x_1 & x_0 & \cdots & x_{n-3} & x_{n-2} \\ x_{n-2} & x_{n-3} & \cdots & x_0 & x_1 \\ x_{n-1} & x_{n-2} & \cdots & x_1 & x_0 \end{bmatrix}^{-1}$$

$$X_{n-1} = \begin{bmatrix} X(1) - \mu \\ X(2) - \mu \\ X(n-1) - \mu \end{bmatrix}$$

$X_n$ is the lag n covariance, and, Y(n) is the nth innovation.

The value for $Y_n$ is the conditional expectation when the underlying distribution is assumed to be multivariate normal. Under reasonable statistical assumptions, it is independent from previous observations and therefore satisfies the requirement of an input variable to a SPRT analysis. Further details of SPRT analysis and related matters can be found in U.S. Pat. No. 5,410,492 which is incorporated by reference herein in its entirety.

A provision exists in the package to recalculate the autocorrelation after a fixed number of observations. This can be compared with the original result and if there is a significant change, the user can decide to accept or reject the new results (see FIG. 3D and 3F).

The SMP software package allows for the superposition and mathematical manipulation of the two serial correlation reduction methods (see FIG. 3B). When performing this calculation, one must be mindful of the creation of data set innovations which can influence the spectrum; and the elimination of the certain spectral components can change the autocorrelation. The most preferred method of using this methodology is to use the innovations to eliminate the high frequency components and then use the Fourier transform to remove the low frequency components.

Whether one chooses the Fourier transform method, autoregression or no filtering at all, training data can be used to compute principal components (see FIG. 3C) by an eigenvalue/eigenvector calculation using the computer software methodology set forth in the Appendix.

Figure 3D:
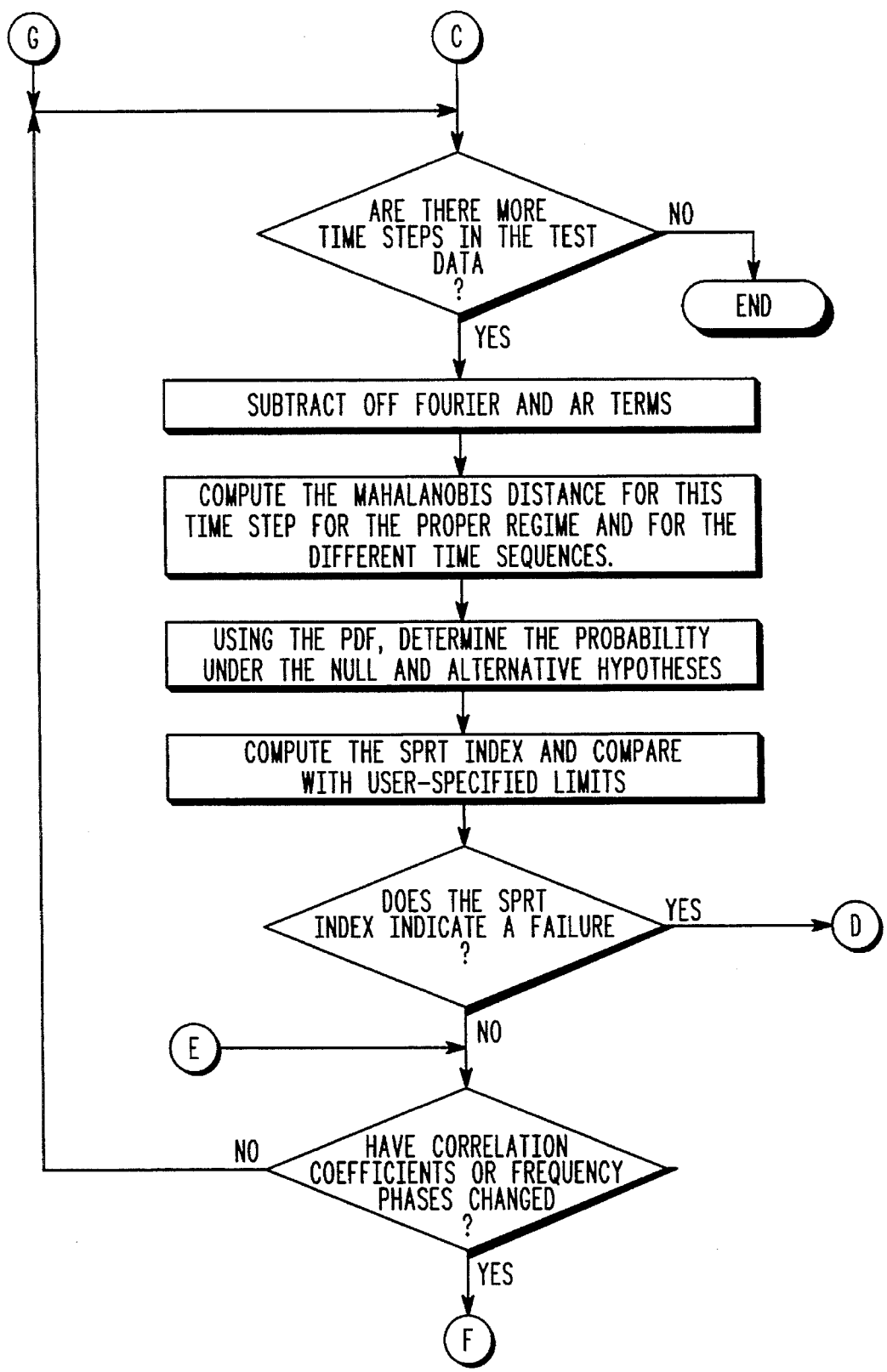
Figure 3E:
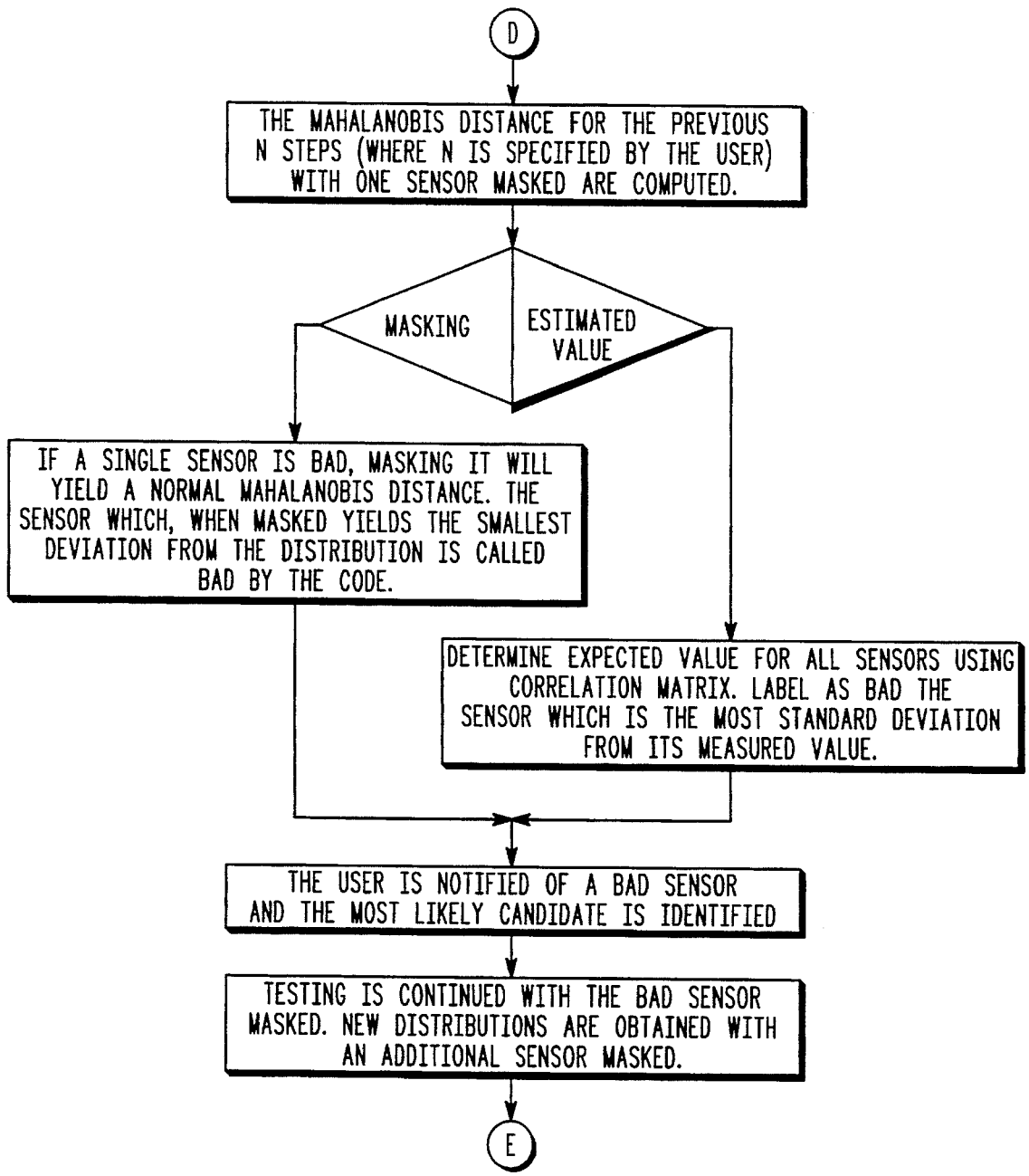
Figure 3G:
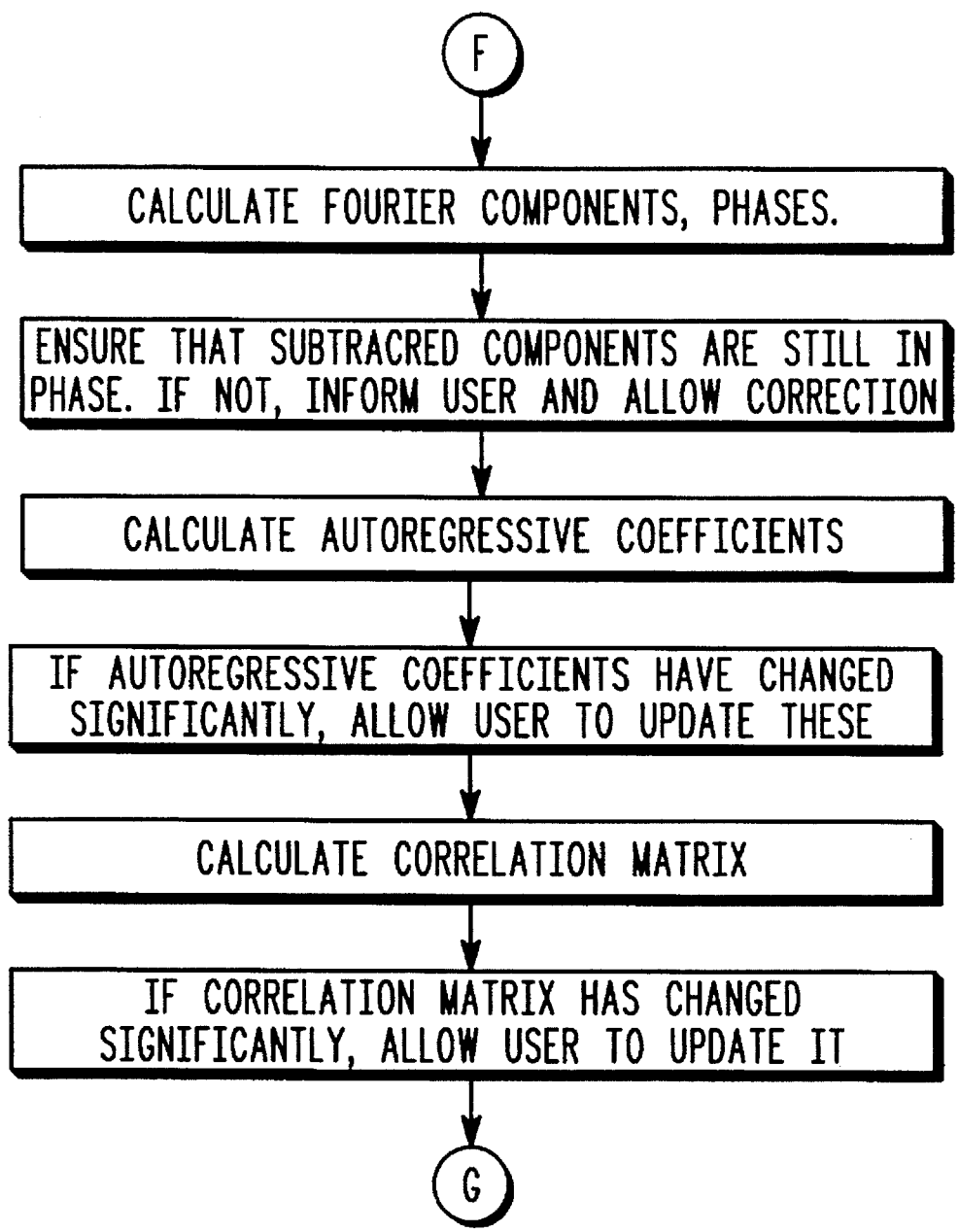

In the first stage of processing using the SMP software package, the variables were treated one at a time with no regard for the correlation which exists between the sensors 16. In the second stage of the processing the presence of the correlation is actively utilized. As shown in FIGS. 3C–3E, this is accomplished by computing the Mahalanobis distance, and this distance is defined as:

$$d = (\chi_i - \bar{\chi})^t S^{-1} (\chi_i - \bar{\chi}).$$

where $$S = \frac{1}{(n-1)} Y^t Y$$

and Y is an n by p matrix whose rows are $(\chi_i - \bar{\chi})^T$.

Figure 4A:
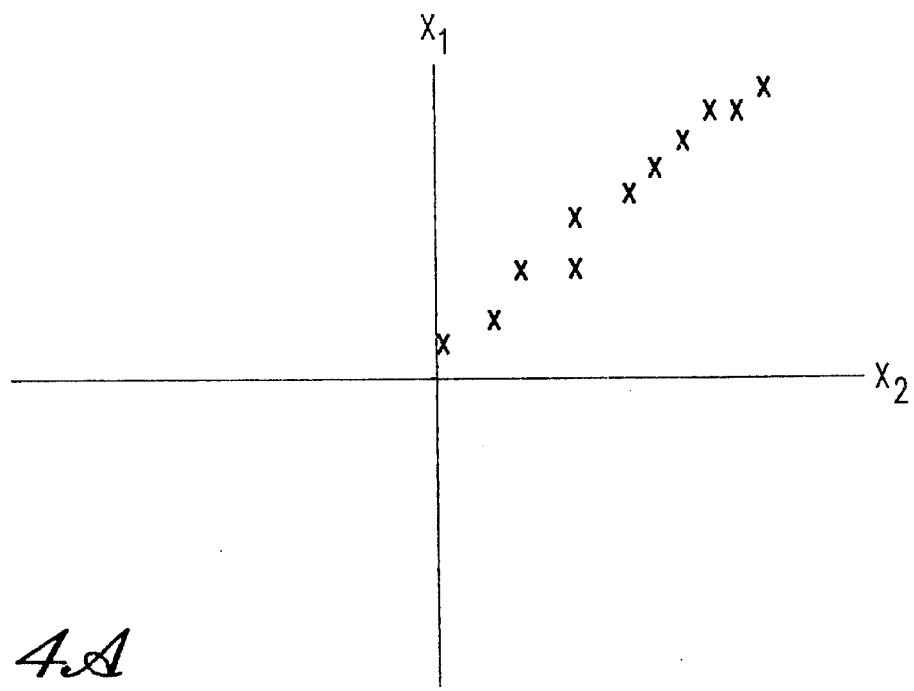
FIG. 4A shows a Mahalanobis distance calculation and FIG. 4B shows a transformed Mahalanobis calculation to principal components.
Figure 4B:
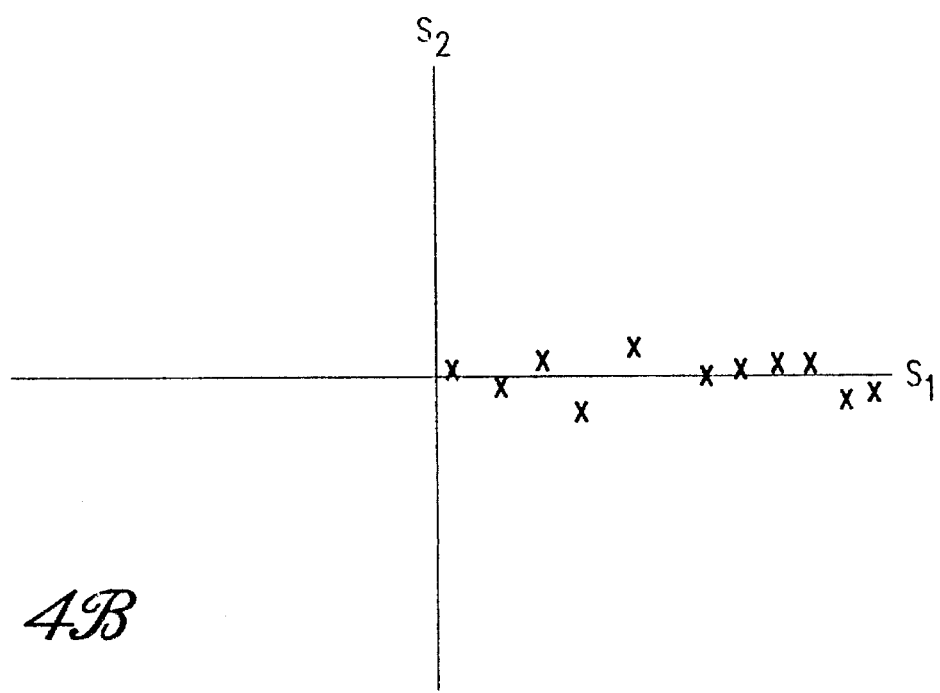

The Mahalanobis distance can be viewed more clearly if a transformation is made to principal components. This transformation is illustrated pictorially in FIGS. 4A and 4B. The first principal component is the direction in which the maximum amount of the variation occurs. As can be seen from the Figure, this is in the $S_1$ direction. A measure of the distance which any point lies from a previous data set can be derived by weighting the squared difference from the mean by the inverse of the standard deviation in that direction, i.e., for directions in which there is large variation in the data. Therefore, large standard deviations, a value far from the mean, would not necessarily result in a large Mahalanobis distance. Conversely, for directions in which there was little variation in the training data, and therefore small standard deviations, a value far from the mean would result in a large Mahalanobis distance. As a result, points which fall in the same pattern as those in the training set would have lower Mahalanobis distances.

In the most preferred embodiment, the Mahalanobis distance is calculated for each time point during the training period. From this information a cumulative distribution function F(di) is estimated using $$F(d_i) = \frac{(\text{number of observations} \leq d_i) - 0.5}{\text{total number of observations}}$$

The slope of this function is then used to determine the likelihood function for the Mahalanobis distance. If one of the sensors 16 goes bad, this distance will increase a statistically significant amount.

The average Mahalanobis distance is also calculated for the case in which one of the sensors 16 is masked (see FIG. 3E). This facilitates the determination of the bad sensor 16. The Mahalanobis distance will be closest to that found in the training data when the bad sensor 16 is masked. In the preferred SMP software package, the capability for discerning a single bad sensor is provided. The capability for extending this to multiple bad sensors 16 using a similar methodology, or a binary search algorithm, is also included as an option for the SMP software package.

At this point, two hypotheses are considered for the incoming raw sensor signals or data information from the sensors 16 monitoring the industrial system 14: the null hypothesis, H0, that there is no signal abnormality is tested and the alternative hypothesis, H1, that there is an abnormal signal from one of the sensors 16 (see FIG. 3D). To perform this test, certain assumptions are preferably made concerning abnormal operations. In the SMP software package, one specifies a multiplier and offset for the Mahalanobis distance which would occur in the case of abnormal operation. This distributional shape is assumed to be the same as that for normal operation.

The following ratio is formed in this analysis:

$$P_n = \frac{\text{Probability of Mahalanobis distance sequence } (d_1, d_2 \ldots, d_n) \text{ given } H_0}{\text{Probability of Mahalanobis distance sequence } (d_1, d_2 \ldots, d_n) \text{ given } H_1}$$

which can be written as:

$$P_n = \prod_{i=1}^{n} \frac{f < d_i | \epsilon(H_0) >}{f < d_i | \epsilon(H_1) >}$$

where $\xi(H_1)$ is used to designate the parameters present in the distribution function which correspond to either the null or alternative hypothesis.

The Wald Wolfowitz theory states that continued sampling should occur when $A < P_n < B$. The null hypothesis (no sensor error or fault) is accepted when $P_n > B$ and rejected if $P_n < A$. The values of the false alarm probability and nondetection probabilities are computed using direct Monte Carlo simulation (analysis preferably done off-line with simulated data) and will vary depending on the failure mechanism. The following relations govern the assignment of the values for A and B:

$$A = \frac{\beta}{1-\alpha}, \text{ and, } B = \frac{1-\beta}{\alpha}$$

where $\alpha$ and $\beta$ are the parameters which can influence the false alarm and nondetection probabilities and can be assigned using accepted statistical practice. This approximate equality has been shown to be correct in a wide range of problems, particularly when the values of $\alpha$ and $\beta$ are small.

The test procedure, as described above, will give an annunciation that one of the sensors 16 has failed. This procedure will not, however, identify the failed sensor 16. As shown in FIG. 3E, to do this, the Mahalanobis distance sequence is computed for the cases in which one of the sensors 16 is masked. This fails for all cases except for the one in which the bad sensor 16 is masked. This method assumes that only a single one of the sensors 16 will fail. If this is not the case, the method can be extended, with significant additional calculational requirements, to multiple sensor failures.

In another form of the invention, a data set can be "linearized" as in FIG. 3A, the fourth step and the first item in FIG. 3C. In this embodiment, the correlation matrix and eigenvector (principal component vector) can be generalized so that it has several regimes for a given variable. The probability will be calculated using the Mahalanobis distance distribution which is computed using the eigenvectors for the particular linearized variable regime. An example of a linearized variable is the power of a nuclear reactor. The operating characteristics of such a reactor vary dramatically as the power is changed. The regimes can be used to linearize the problem. These regimes can also be used to turn off the test at times were it is not appropriate (e.g., startup or scrams).

As an example of application of the preferred technique, the effluent thermocouple sensors on the EBR-II (a nuclear reactor at Argonne National Laboratory Wes0 were monitored. The average sample number (the number of samples necessary before a determination could be made of whether the system 14 was normal or abnormal, typically about two to ten samples, "ASN" hereinafter) and false alarm probabilities (the probability that the test would indicate an abnormal state when an abnormal state did not exist in fact, "FAP" hereinafter) were computed as a function of parameters $\alpha$ and $\beta$ and the offset and multiplier of the Mahalanobis distance distribution. The results are given in Table 1. For this analysis, 8,000 time points, each with twenty sensor values, were used. Of these, the first 7,000 were used for the principal component analysis ("PCA") and the next 1,000 points were used to determine the ASN, and also determine the FAP.

TABLE 1

Average Sample Number (ASN) and False Alarm Probability (FAP) as a Function of Test Parameters

| α | β | Offset | Multiplier | ASN | FAP |
|---|---|---|---|---|---|
| 0.001 | 0.001 | 0.0 | 2.0 | 10. | 68.0% |
| 0.001 | 0.001 | 10.0 | 1.0 | 8.06 | 32.3% |
| 0.001 | 0.001 | 10.0 | 2.0 | 3.57 | 9.3% |
| 0.001 | 0.001 | 20.0 | 2.0 | 2.46 | 1.7% |
| 0.01 | 0.001 | 10.0 | 2.0 | 3.45 | 12.4% |
| 0.001 | 0.01 | 10.0 | 2.0 | 2.65 | 7.7% |
| 0.001 | 0.001 | 20.0 | 4.0 | 2.38 | 0.5% |

The FAP decreased when parameter $\beta$ is increased, when the offset is increased, or when the multiplier is increased. This decrease occurs because these factors all increase the distance between $H_0$ and $H_1$, thereby decreasing the likelihood that $H_1$ will be chosen given $H_0$. The FAP is increased when parameter $\alpha$ is increased. The ASN decreases as $H_0$ and $H_1$ are separated because the likelihood ratio criterion is met more quickly when the two distributions are distinct.

Using the above dependencies, it is possible to set the false alarm level to any desired value.

An analysis was also performed in which one of the signals from one of the sensors 16 was ramped at 0.1 standard deviations/me point using the parameters in the last line of Table 1. When this was done, it required thirteen time steps for the SMP software package to detect the abnormality. The SMP software package correctly identified the errant sensor 16 by comparing the Mahalanobis distances with one of the sensors 16 masked.

The method described hereinbefore using the Mahalanobis distance as a test statistic has been developed and has been demonstrated as a viable way of determining abnormal readings from the effluent thermocouple sensors 16 in EBR.II. This method, in general, also can incorporate the SPRT test methodology using an empirical distribution to determine probabilities.

The ability of this methodology to detect faults in the industrial system 14 is dependent on the variables having a significant correlation. This correlation results in a space where it is less likely to obtain observations. The rank of this space is determined by the total number of dimensions minus the number of dimensions in which the singular values are significant (>1.0% of the maximum eigenvalue). At the present time, there are nine significant values, which indicates significant correlation.

The invention is therefore able to carry out surveillance and detailed analysis of industrial processes to provide alarm notifications for statistically significant deviations from proper operating conditions. The invention has broad applicability for any system in which correlated individual sensors are present. These individual sensors can be at the same or different locations and can be measuring the same or different variables. The industrial system 14 can include without limitation a nuclear power station, fossil power stations, automobiles, aircraft, shops, water and waste treatment facilities, manufacturing lines, pumping stations, environmental systems, gas lines, chemical processing systems, pharmaceutical manufacturing systems and biomedical systems.

While preferred embodiments of the invention have been shown and described, it will be clear to those skilled in the art that various changes and modifications can be made without departing from the invention in its broader aspects as set forth in the claims provided hereinafter.

APPENDIX

COMPUTER SOFTWARE

Main Program (Titled princval)

This routine is the driver for the program and contains most of the logic. It begins by querying the user for the input parameters, including the number of sensor signals, the number of training time points, the file storage locations, the false alarm and missed detection probabilities.

The correlation structure of the data is calculated (the means are calculated first) and the subroutine ssvdc (a Linpack canned program) is used to determine the singular vectors (eigenvectors in the case of a full rank matrix). The correlation structure is also determined for the cases in which one sensor is masked.

From the correlation structure, the Mahalanobis distance distribution is computed. This is done through the use of subroutines bsort and slopma.

The mean and standard deviation of the Mahalanobis distance are determined for both the cases in which all sensors are present and for the case in which one is masked.

For each time point, the Mahalanobis distance is computed. The likelihood of achieving this under the null and alternative hypotheses are also computed. The SPRT statistic is updated to reflect this time point value. Based on the value of the SPRT statistic, the code either continues testing, declares that there is no sensor failure, or indicates that there is a sensor failure. For the former two possibilities, the next time point is considered. If a sensor failure is indicated, the code determines, for each single sensor masked case, the number of standard deviations from the mean value. The sensor which is declared inoperative is the one which yields the lowest number of standard deviations from the mean when it is masked.

```
      program princval
c
c   this code performs a singular value decomposition on the
c   variance covariance matrix.  It then uses this to establish
c   whether or not a particular sensor is not performing correctly
c
c   date: September 8, 1992
c
c   author:   A. M. White,
c             Reactor Analysis Division
c             Argonne National Laboratory
c
      character*40 afile
      dimension varcov(100,100),umean(100),dat(100),
     1ainv(100,100),v1(99,99,99),s1(99,99),distma(20000)
      dimension s(100),e(100),u(100,100),v(100,100),work(100)
      dimension tmp1(100),sdisma1(100),sqdism1(100),dismah1(100),
     1dmean1(100),dsqrt1(100),slpe(20000),slp2(20000)
      write(*,*)' How many variables are there at a time point?'
      write(*,*)' (maximum = 100)'
      read(*,*)nvar
      write(*,*)' How many lines are required for one time point?'
      read(*,*)nline
      write(*,*)' How many time points are there for training?'
      read(*,*)ntp
      if(ntp.gt.20000)write(*,197)
  197 format(' Number of points > 20000, only first 20000 will',
     1' be used in the calculation'/' of the Mahalanobis distance',
     2' calculation.')
      write(*,*)' How many subsequent points are to be tested?'
      read(*,*)ntpp
      write(*,*)' What is the name of the file containing the data?'
      read(*,100)afile
  100 format(a40)
      write(*,*)' What is the multiplier of the Mahalanobis ',
     1'distance distribution for the alternative hypothesis?'
      read(*,*)amult
      write(*,*)' What is the offset of the Mahalanobis ',
     1'distance distribution for the alternative hypothesis?'
      read(*,*)aoff
      write(*,*)' What is the false alarm probability?'
      read(*,*)fap
      write(*,*)' What is the non-detection probability?'
      read(*,*)pnd
      ak1=alog((1.-fap)/pnd)
      ak0=alog(fap/(1.-pnd))
      open(unit=7,file=afile,status='old')
c
c   first calculate the mean value of all of the parameters
c
      do 10 i=1,ntp
      read(7,*)(dat(j),j=1,nvar)
      do 20 j=1,nvar
      umean(j)=umean(j)+dat(j)
   20 continue
   10 continue
      do 30 j=1,nvar
      umean(j)=umean(j)/float(ntp)
   30 continue
```

```
      rewind 7
      write(11,*)umean
      write(*,*)' Completed calculating means, Proceeding to'
      write(*,*)' calculate variances'
c
c   calculate the variance-covariance matrix for measurements made
c   at the same time
c
      do 40 k=1,ntp
      read(7,*)(dat(i),i=1,nvar)
      do 50 i=1,nvar
      do 60 j=1,nvar
      varcov(i,j)=varcov(i,j)+(dat(i)-umean(i))*(dat(j)-
     1umean(j))
   60 continue
   50 continue
   40 continue
      do 70 i=1,nvar
      do 80 j=1,nvar
      varcov(i,j)=varcov(i,j)/float(ntp-1)
   80 continue
   70 continue
      write(*,*)' Completed calculation of variances'
      do 71 i=1,nvar
      do 72 j=1,nvar
      write(12,*)i,j,varcov(i,j)
      tmp1(j)=varcov(i,j)/(varcov(i,i)*varcov(j,j))**.5
   72 continue
      write(13,1987)(tmp1(j),j=1,nvar)
 1987 format(22(1x,f5.3))
   71 continue
c
c   copy the matrix into a scratch matrix
c
      do 126 i=1,nvar
      do 127 j=1,nvar
      ainv(i,j)=varcov(i,j)
  127 continue
  126 continue
c
c   determine the eigenvalues and principle components of the variance
c   covariance matrix
c
      job=11
      idum=100
      call ssvdc(ainv,idum,nvar,nvar,s,e,u,idum,v,idum,work,job,info)
c
c   write out the singular values (or eigenvalues)
c
      write(*,202)
  202 format(' Eigenvalues')
      do 128 i=1,nvar
      write(*,*)i,s(i)
  128 continue
c
c   determine the number of significant eigenvectors
c
      do 129 i=2,nvar
      if(s(i).lt.0.02*s(1))go to 131
  129 continue
```

```
        write(*,*)' No insignificant eigenvectors'
        go to 132
131     nsig=i-1
132     write(*,133)nsig
133     format(' Number of significant eigenvectors = ',i4)
c
c   output the right singular vectors of the matrix
c
        do 134 i=1,nsig
        write(*,136)i
136     format(' Singular vector #',i3)
        write(*,135)(v(j,i),j=1,nvar)
135     format(6(1x,e12.4))
134     continue
c
c   determine the eigenvalues and principle components for the
c   case when one instrument is masked
c
c   first set up the variance-covariance matrix
c
        do 161 i=1,nvar
        l=0
        do 162 j=1,nvar
        if(j.eq.i)go to 162
        l=l+1
        m=0
        do 163 k=1,nvar
        if(k.eq.i)go to 163
        m=m+1
        ainv(l,m)=varcov(j,k)
163     continue
162     continue
c
c   next call ssvdc to perform the singular value decomposition
c
        idum1=99
        nvar1=nvar-1
        call ssvdc(ainv,idum,nvar1,nvar1,s1(1,i),e,u,idum,
     1  v1(1,1,i),idum1,work,job,info)
161     continue
c
c   read in the previous data and determine the distribution
c   of the Mahalanobis distance
c
        rewind 7
        sdisma=0.0
        sqdism=0.0
        do 137 i=1,ntp
c
c   determine the coefficients of the singular vectors
c
        read(7,*)(dat(l),l=1,nvar)
        dismah=0.0
        do 138 j=1,nvar
        sumdis=0.
        do 139 k=1,nvar
        sumdis=sumdis+(dat(k)-umean(k))*v(k,j)
139     continue
        dismah=dismah+sumdis**2/s(j)
138     continue
```

```
      if(i.lt.20000)distma(i)=dismah
      sdisma=sdisma+dismah
      sqdism=sqdism+dismah**2
  137 continue
c
c   sort the mahalanobis distances using a bubble sort technique
c
      call bsort(distma,ntp)
c
c   compute the average slope for the nearest 30 points to any given
c   point
c
      call slopma(distma,slpe,ntp)
c
c   determine mean and standard deviation of the distance
c
      dmean=sdisma/float(ntp)
      dsqrt=((sqdism-sdisma**2/float(ntp))/(float(ntp)-1.))**.5
      write(*,241)dmean,dsqrt
  241 format(' The mean of the Mahalanobis distribution is ',e14.5/
     1' The standard deviation of the Mahalanobis distribution is ',
     2e14.5)
      write(9,1234)(i,slpe(i),distma(i),i=1,ntp)
 1234 format(1x,i5,1x,e14.5,1x,e14.5)
c
c   determine the mean and standard deviations for the Mahalanobis
c   distances for the other cases with a sensor masked
c
      rewind 7
      do 171 i=1,nvar
      sdismal(i)=0.0
      sqdism1(i)=0.0
  171 continue
      do 172 i=1,ntp
c
c   determine the coefficients of the singular vectors
c
      read(7,*)(dat(l),l=1,nvar)
      do 173 j=1,nvar
      dismah1(j)=0.0
  173 continue
c
c   calculate for matrix j of the one sensor masked cases
c
      do 174 j=1,nvar
c
c   column k (there are only nvar - 1 columns)
c
      do 176 k=1,nvar - 1
c
c   row l (we must be careful because the data does not always
c   correspond to the correct row due to rank = nvar - 1
c
      sumdis=0.0
      do 177 l=1,nvar
      if(l.eq.j)go to 177
      if(l.gt.j)then
      m=l-1
      else
      m=l
```

```
      end if
c
c   sumdis sums up the components to form the dot product
c
      sumdis=sumdis+(dat(l)-umean(l))*vl(m,k,j)
  177 continue
      dismah1(j)=dismah1(j)+sumdis**2/sl(k,j)
  176 continue
      sdismal(j)=sdismal(j)+dismah1(j)
      sqdism1(j)=sqdism1(j)+dismah1(j)**2
  174 continue
  172 continue
c
c   compute the mean and standard deviation of the distance
c
      do 178 j=1,nvar
      dmean1(j)=sdismal(j)/float(ntp)
      dsqrt1(j)=((sqdism1(j)-sdismal(j)**2/float(ntp))
     1 /(float(ntp)-1.))**.5
  178 continue
      write(23,8543)(j,dmean1(j),dsqrt1(j),j=1,nvar)
 8543 format(1x,i3,1x,e14.6,1x,e14.6)
c
c   review the previous data and try to determine which sensor
c   is out of whack
c
c
c   compute the mahalanobis distance
c
      ntim=0
      do 180 j=1,ntpp
      read(7,*)(dat(l),l=1,nvar)
      dismah=0.0
      do 181 j=1,nvar
      sumdis=0.0
      do 182 k=1,nvar
      sumdis=sumdis+(dat(k)-umean(k))*v(k,j)
  182 continue
      dismah=dismah+sumdis**2/s(j)
  181 continue
c
c   compute the likelihood for this distance and the null hypothesis
c
      do 221 j=1,ntp
      if(dismah.lt.distma(j))then
c     alike=slpe(j)+dismah*slp2(j)
      alike=slpe(j)
      go to 222
      end if
  221 continue
  222 continue
c
c   compute the likelihood for this distance and the alternative hypothesis
c
      do 223 j=1,ntp
      if(dismah.lt.distma(j)*amult+aoff)then
c     alikl=slpe(j)+dismah*amult*slp2(j)
      alikl=slpe(j)
      go to 224
      end if
```

```
      223 continue
      224 continue
          ntim=ntim+1
          tstat=tstat+alog(alike/alik1)
          write(8,*)i,ntim,tstat
          if(tstat.gt.ak1)then
          write(10,277)i,ntim
      277 format(1x,i3,1x,i3,1x,'1')
          write(*,225)i,ntim
      225 format(' At time point ',i6,' after ',i6,' time steps, the ',
         1'test indicates that'/' the instruments are fine.')
          ntim=0
          tstat=0.
          go to 180
          end if
          if(tstat.lt.ak0)then
c
c    loop over the last ntim observations
c
          ntim1=ntim*nline
          do 273 j=1,ntim1
          backspace 7
      273 continue
          disjmn=1.0e+20
          njmn=0
          do 274 ij=1,ntim
          read(7,*)(dat(ik),ik=1,nvar)
c
c    determine the mahalanobis distance for sensors masked
c
          do 183 j=1,nvar
          dismah1(j)=0.
c
c    column k (there are only nvar - 1 columns)
c
          do 186 k=1,nvar - 1
c
c    row l (we must be careful because the data does not always
c    correspond to the correct row due to rank = nvar - 1
c
          sumdis=0.0
          do 187 l=1,nvar
          if(l.eq.j)go to 187
          if(l.gt.j)then
          m=l-1
          else
          m=l
          end if
c
c    sumdis sums up the components to form the dot product
c
          sumdis=sumdis+(dat(l)-umean(l))*v1(m,k,j)
      187 continue
          dismah1(j)=dismah1(j)+sumdis**2/s1(k,j)
      186 continue
      183 continue
c
c    test for distance in standard deviations from origin
c    the one with the minimum distance is the bad one
c
```

```
      do 188 l=1,nvar
      disj=(dismah1(l)-dmean1(l))/dsqrt1(l)
      if(disj.lt.disjmn)then
      njmn=l
      disjmn=disj
      end if
188   continue
      write(24,*)i,dismah1
274   continue
      write(*,201)i,ntim,njmn
201   format(' For time point ',i6,' after ',i6,' steps,'
     1' the bad sensor is determined to be number ',i3)
      write(10,278)i,ntim
278   format(1x,i3,1x,i3,1x,'2')
      dismin=1.e+20
      do 189 l=1,nvar
      disj=(dismah1(l)-dmean1(l))/dsqrt1(l)
      if(disj.lt.dismin)then
      njmm=l
      dismin=disj
      end if
189   continue
      if(njmm.ne.njmn)then
      write(*,276)njmm
276   format(' However, for the last time period, sensor ',i3,
     1' appeared to be the worst')
      end if
      ntim=0.
      tstat=0.
      end if
180   continue
      stop
      end
```

Subroutine ssvdc

This subroutine is taken from LINPACK (see for example, Dongarra, et. al. " LINPACK Users' Guide," SIAM, Philadelphia, 1979.). It can be replaced by the ssyev subroutine from the LAPACK library. The subroutine performs a singular value decomposition on the correlation matrix to obtain the principal components. Because the correlation matrix is of full rank, it is possible to substitute and eigenvector/eigenvalue determination algorithm in its place. This increases the speed, but potentially could result in problems in the case of exact colinearity. A complete description of the subroutine can be found in the LINPACK Users' Guide referenced above. Auxilliary subroutines for SSVDC include sswap, srot, srotg, saxpy, sdot, sscal, and snrm2.

```
      subroutine ssvdc(x,ldx,n,p,s,e,u,ldu,v,ldv,work,job,info)
      integer ldx,n,p,ldu,ldv,job,info
      real x(ldx,1),s(1),e(1),u(ldu,1),v(ldv,1),work(1)
c
c
c     ssvdc is a subroutine to reduce a real nxp matrix x by
c     orthogonal transformations u and v to diagonal form. the
c     diagonal elements s(i) are the singular values of x. the
c     columns of u are the corresponding left singular vectors,
c     and the columns of v the right singular vectors.
c
c     on entry
c
c         x         real(ldx,p), where ldx.ge.n.
c                   x contains the matrix whose singular value
c                   decomposition is to be computed. x is
c                   destroyed by ssvdc.
c
c         ldx       integer.
c                   ldx is the leading dimension of the array x.
c
c         n         integer.
c                   n is the number of rows of the matrix x.
c
c         p         integer.
c                   p is the number of columns of the matrix x.
c
c         ldu       integer.
c                   ldu is the leading dimension of the array u.
c                   (see below).
c
c         ldv       integer.
c                   ldv is the leading dimension of the array v.
c                   (see below).
c
c         work      real(n).
c                   work is a scratch array.
c
c         job       integer.
c                   job controls the computation of the singular
c                   vectors. it has the decimal expansion ab
c                   with the following meaning
c
c                         a.eq.0    do not compute the left singular
c                                   vectors.
c                         a.eq.1    return the n left singular vectors
c                                   in u.
c                         a.ge.2    return the first min(n,p) singular
c                                   vectors in u.
c                         b.eq.0    do not compute the right singular
c                                   vectors.
c                         b.eq.1    return the right singular vectors
c                                   in v.
c
c     on return
c
c         s         real(mm), where mm=min(n+1,p).
c                   the first min(n,p) entries of s contain the
c                   singular values of x arranged in descending
```

```
c                       order of magnitude.
c
c           e           real(p).
c                       e ordinarily contains zeros.  however see the
c                       discussion of info for exceptions.
c
c           u           real(ldu,k), where ldu.ge.n.  if joba.eq.1 then
c                                    k.eq.n, if joba.ge.2 then
c                                    k.eq.min(n,p).
c                       u contains the matrix of left singular vectors.
c                       u is not referenced if joba.eq.0.  if n.le.p
c                       or if joba.eq.2, then u may be identified with x
c                       in the subroutine call.
c
c           v           real(ldv,p), where ldv.ge.p.
c                       v contains the matrix of right singular vectors.
c                       v is not referenced if job.eq.0.  if p.le.n,
c                       then v may be identified with x in the
c                       subroutine call.
c
c           info        integer.
c                       the singular values (and their corresponding
c                       singular vectors) s(info+1),s(info+2),...,s(m)
c                       are correct (here m=min(n,p)).  thus if
c                       info.eq.0, all the singular values and their
c                       vectors are correct.  in any event, the matrix
c                       b = trans(u)*x*v is the bidiagonal matrix
c                       with the elements of s on its diagonal and the
c                       elements of e on its super-diagonal (trans(u)
c                       is the transpose of u).  thus the singular
c                       values of x and b are the same.
c
c     linpack. this version dated 03/19/79 .
c              correction to shift calculation made 2/85.
c     g.w. stewart, university of maryland, argonne national lab.
c
c     ***** uses the following functions and subprograms.
c
c     external srot
c     blas saxpy,sdot,sscal,sswap,snrm2,srotg
c     fortran abs,amax1,max0,min0,mod,sqrt
c
c     internal variables
c
      integer i,iter,j,jobu,k,kase,kk,l,ll,lls,lm1,lp1,ls,lu,m,maxit,
     *        mm,mm1,mp1,nct,nctp1,ncu,nrt,nrtp1
      real sdot,t,r
      real b,c,cs,el,emm1,f,g,snrm2,scale,shift,sl,sm,sn,smm1,t1,test,
     *     ztest
      logical wantu,wantv
c
c
c     set the maximum number of iterations.
c
      maxit = 30
c
c     determine what is to be computed.
c
      wantu = .false.
      wantv = .false.
```

```
            jobu = mod(job,100)/10
            ncu = n
            if (jobu .gt. 1) ncu = min0(n,p)
            if (jobu .ne. 0) wantu = .true.
            if (mod(job,10) .ne. 0) wantv = .true.
c
c     reduce x to bidiagonal form, storing the diagonal elements
c     in s and the super-diagonal elements in e.
c
            info = 0
            nct = min0(n-1,p)
            nrt = max0(0,min0(p-2,n))
            lu = max0(nct,nrt)
            if (lu .lt. 1) go to 170
            do 160 l = 1, lu
               lp1 = l + 1
               if (l .gt. nct) go to 20
c
c           compute the transformation for the l-th column and
c           place the l-th diagonal in s(l).
c
               s(l) = snrm2(n-l+1,x(l,l),1)
               if (s(l) .eq. 0.0e0) go to 10
                  if (x(l,l) .ne. 0.0e0) s(l) = sign(s(l),x(l,l))
                  call sscal(n-l+1,1.0e0/s(l),x(l,l),1)
                  x(l,l) = 1.0e0 + x(l,l)
   10          continue
               s(l) = -s(l)
   20          continue
               if (p .lt. lp1) go to 50
               do 40 j = lp1, p
                  if (l .gt. nct) go to 30
                  if (s(l) .eq. 0.0e0) go to 30
c
c              apply the transformation.
c
                  t = -sdot(n-l+1,x(l,l),1,x(l,j),1)/x(l,l)
                  call saxpy(n-l+1,t,x(l,l),1,x(l,j),1)
   30             continue
c
c           place the l-th row of x into e for the
c           subsequent calculation of the row transformation.
c
                  e(j) = x(l,j)
   40          continue
   50          continue
               if (.not.wantu .or. l .gt. nct) go to 70
c
c           place the transformation in u for subsequent back
c           multiplication.
c
               do 60 i = l, n
                  u(i,l) = x(i,l)
   60          continue
   70          continue
               if (l .gt. nrt) go to 150
c
c           compute the l-th row transformation and place the
c           l-th super-diagonal in e(l).
c
```

```
              e(l) = snrm2(p-l,e(lpl),1)
              if (e(l) .eq. 0.0e0) go to 80
                 if (e(lpl) .ne. 0.0e0) e(l) = sign(e(l),e(lpl))
                 call sscal(p-l,1.0e0/e(l),e(lpl),1)
                 e(lpl) = 1.0e0 + e(lpl)
   80         continue
              e(l) = -e(l)
              if (lpl .gt. n .or. e(l) .eq. 0.0e0) go to 120
c
c                apply the transformation.
c
              do 90 i = lpl, n
                 work(i) = 0.0e0
   90         continue
              do 100 j = lpl, p
                 call saxpy(n-l,e(j),x(lpl,j),1,work(lpl),1)
  100         continue
              do 110 j = lpl, p
                 call saxpy(n-l,-e(j)/e(lpl),work(lpl),1,x(lpl,j),1)
  110         continue
  120         continue
              if (.not.wantv) go to 140
c
c                place the transformation in v for subsequent
c                back multiplication.
c
              do 130 i = lpl, p
                 v(i,l) = e(i)
  130         continue
  140      continue
  150   continue
  160 continue
  170 continue
c
c     set up the final bidiagonal matrix or order m.
c
      m = min0(p,n+1)
      nctpl = nct + 1
      nrtpl = nrt + 1
      if (nct .lt. p) s(nctpl) = x(nctpl,nctpl)
      if (n .lt. m) s(m) = 0.0e0
      if (nrtpl .lt. m) e(nrtpl) = x(nrtpl,m)
      e(m) = 0.0e0
c
c     if required, generate u.
c
      if (.not.wantu) go to 300
         if (ncu .lt. nctpl) go to 200
         do 190 j = nctpl, ncu
            do 180 i = 1, n
               u(i,j) = 0.0e0
  180       continue
            u(j,j) = 1.0e0
  190    continue
  200    continue
         if (nct .lt. 1) go to 290
         do 280 ll = 1, nct
            l = nct - ll + 1
            if (s(l) .eq. 0.0e0) go to 250
               lpl = l + 1
```

```
              if (ncu .lt. lp1) go to 220
              do 210 j = lp1, ncu
                 t = -sdot(n-l+1,u(l,l),1,u(l,j),1)/u(l,l)
                 call saxpy(n-l+1,t,u(l,l),1,u(l,j),1)
 210          continue
 220          continue
              call sscal(n-l+1,-1.0e0,u(l,l),1)
              u(l,l) = 1.0e0 + u(l,l)
              lm1 = l - 1
              if (lm1 .lt. 1) go to 240
              do 230 i = 1, lm1
                 u(i,l) = 0.0e0
 230          continue
 240          continue
           go to 270
 250       continue
              do 260 i = 1, n
                 u(i,l) = 0.0e0
 260          continue
              u(l,l) = 1.0e0
 270       continue
 280    continue
 290    continue
 300 continue
c
c    if it is required, generate v.
c
     if (.not.wantv) go to 350
        do 340 ll = 1, p
           l = p - ll + 1
           lp1 = l + 1
           if (l .gt. nrt) go to 320
           if (e(l) .eq. 0.0e0) go to 320
              do 310 j = lp1, p
                 t = -sdot(p-l,v(lp1,l),1,v(lp1,j),1)/v(lp1,l)
                 call saxpy(p-l,t,v(lp1,l),1,v(lp1,j),1)
 310          continue
 320       continue
           do 330 i = 1, p
              v(i,l) = 0.0e0
 330       continue
           v(l,l) = 1.0e0
 340    continue
 350 continue
c
c    main iteration loop for the singular values.
c
     mm = m
     iter = 0
 360 continue
c
c       quit if all the singular values have been found.
c
c    ...exit
        if (m .eq. 0) go to 620
c
c       if too many iterations have been performed, set
c       flag and return.
c
        if (iter .lt. maxit) go to 370
```

```
                  info = m
c     ......exit
                  go to 620
  370       continue
c
c           this section of the program inspects for
c           negligible elements in the s and e arrays.  on
c           completion the variables kase and l are set as follows.
c
c                 kase = 1      if s(m) and e(l-1) are negligible and l.lt.m
c                 kase = 2      if s(l) is negligible and l.lt.m
c                 kase = 3      if e(l-1) is negligible, l.lt.m, and
c                               s(l), ..., s(m) are not negligible (qr step).
c                 kase = 4      if e(m-1) is negligible (convergence).
c
            do 390 ll = 1, m
               l = m - ll
c     ...exit
               if (l .eq. 0) go to 400
               test = abs(s(l)) + abs(s(l+1))
               ztest = test + abs(e(l))
               if (ztest .ne. test) go to 380
                  e(l) = 0.0e0
c     ......exit
                  go to 400
  380          continue
  390       continue
  400       continue
            if (l .ne. m - 1) go to 410
               kase = 4
            go to 480
  410       continue
               lp1 = l + 1
               mp1 = m + 1
               do 430 lls = lp1, mp1
                  ls = m - lls + lp1
c     ...exit
                  if (ls .eq. l) go to 440
                  test = 0.0e0
                  if (ls .ne. m) test = test + abs(e(ls))
                  if (ls .ne. l + 1) test = test + abs(e(ls-1))
                  ztest = test + abs(s(ls))
                  if (ztest .ne. test) go to 420
                     s(ls) = 0.0e0
c     ......exit
                     go to 440
  420             continue
  430          continue
  440          continue
               if (ls .ne. l) go to 450
                  kase = 3
               go to 470
  450          continue
               if (ls .ne. m) go to 460
                  kase = 1
               go to 470
  460          continue
                  kase = 2
                  l = ls
  470          continue
```

```
      480       continue
                l = l + 1
c
c               perform the task indicated by kase.
c
                go to (490,520,540,570), kase
c
c               deflate negligible s(m).
c
      490       continue
                    mm1 = m - 1
                    f = e(m-1)
                    e(m-1) = 0.0e0
                    do 510 kk = 1, mm1
                        k = mm1 - kk + 1
                        t1 = s(k)
                        call srotg(t1,f,cs,sn)
                        s(k) = t1
                        if (k .eq. 1) go to 500
                            f = -sn*e(k-1)
                            e(k-1) = cs*e(k-1)
      500           continue
                    if (wantv) call srot(p,v(1,k),1,v(1,m),1,cs,sn)
      510       continue
                go to 610
c
c               split at negligible s(l).
c
      520       continue
                    f = e(l-1)
                    e(l-1) = 0.0e0
                    do 530 k = l, m
                        t1 = s(k)
                        call srotg(t1,f,cs,sn)
                        s(k) = t1
                        f = -sn*e(k)
                        e(k) = cs*e(k)
                        if (wantu) call srot(n,u(1,k),1,u(1,l-1),1,cs,sn)
      530       continue
                go to 610
c
c               perform one qr step.
c
      540       continue
c
c               calculate the shift.
c
                scale = amax1(abs(s(m)),abs(s(m-1)),abs(e(m-1)),abs(s(l)),
     *                        abs(e(l)))
                sm = s(m)/scale
                smm1 = s(m-1)/scale
                emm1 = e(m-1)/scale
                sl = s(l)/scale
                el = e(l)/scale
                b = ((smm1 - sm)*(smm1 + sm) + emm1**2)/2.0e0
                c = sm*emm1)**2
                shift = 0.0e0
                if (b .eq. 0.0e0 .and. c .eq. 0.0e0) go to 550
                    shift = sqrt(b**2+c)
                    if (b .lt. 0.0e0) shift = -shift
```

```
                       shift = c/(b + shift)
     550           continue
                   f = (sl + sm)*(sl - sm) + shift
                   g = sl*el
c
c          chase zeros.
c
                   mm1 = m - 1
                   do 560 k = l, mm1
                      call srotg(f,g,cs,sn)
                      if (k .ne. 1) e(k-1) = f
                      f = cs*s(k) + sn*e(k)
                      e(k) = cs*e(k) - sn*s(k)
                      g = sn*s(k+1)
                      s(k+1) = cs*s(k+1)
                      if (wantv) call srot(p,v(1,k),1,v(1,k+1),1,cs,sn)
                      call srotg(f,g,cs,sn)
                      s(k) = f
                      f = cs*e(k) + sn*s(k+1)
                      s(k+1) = -sn*e(k) + cs*s(k+1)
                      g = sn*e(k+1)
                      e(k+1) = cs*e(k+1)
                      if (wantu .and. k .lt. n)
     +                   call srot(n,u(1,k),1,u(1,k+1),1,cs,sn)
     560           continue
                   e(m-1) = f
                   iter = iter + 1
                go to 610
c
c          convergence.
c
     570        continue
c
c          make the singular value positive.
c
                   if (s(l) .ge. 0.0e0) go to 580
                      s(l) = -s(l)
                      if (wantv) call sscal(p,-1.0e0,v(1,l),1)
     580           continue
c
c          order the singular value.
c
     590           if (l .eq. mm) go to 600
c                ...exit
                      if (s(l) .ge. s(l+1)) go to 600
                      t = s(l)
                      s(l) = s(l+1)
                      s(l+1) = t
                      if (wantv .and. l .lt. p)
     *                   call sswap(p,v(1,l),1,v(1,l+1),1)
                      if (wantu .and. l .lt. n)
     *                   call sswap(n,u(1,l),1,u(1,l+1),1)
                      l = l + 1
                go to 590
     600           continue
                   iter = 0
                   m = m - 1
     610        continue
             go to 360
     620  continue
```

```
      return
      end
      subroutine sswap (n,sx,incx,sy,incy)
c
c     interchanges two vectors.
c     uses unrolled loops for increments equal to 1.
c     jack dongarra, linpack, 3/11/78.
c
      real sx(1),sy(1),stemp
      integer i,incx,incy,ix,iy,m,mp1,n
c
      if(n.le.0)return
      if(incx.eq.1.and.incy.eq.1)go to 20
c
c       code for unequal increments or equal increments not equal
c         to 1
c
      ix = 1
      iy = 1
      if(incx.lt.0)ix = (-n+1)*incx + 1
      if(incy.lt.0)iy = (-n+1)*incy + 1
      do 10 i = 1,n
        stemp = sx(ix)
        sx(ix) = sy(iy)
        sy(iy) = stemp
        ix = ix + incx
        iy = iy + incy
   10 continue
      return
c
c       code for both increments equal to 1
c
c
c       clean-up loop
c
   20 m = mod(n,3)
      if( m .eq. 0 ) go to 40
      do 30 i = 1,m
        stemp = sx(i)
        sx(i) = sy(i)
        sy(i) = stemp
   30 continue
      if( n .lt. 3 ) return
   40 mp1 = m + 1
      do 50 i = mp1,n,3
        stemp = sx(i)
        sx(i) = sy(i)
        sy(i) = stemp
        stemp = sx(i + 1)
        sx(i + 1) = sy(i + 1)
        sy(i + 1) = stemp
        stemp = sx(i + 2)
        sx(i + 2) = sy(i + 2)
        sy(i + 2) = stemp
   50 continue
      return
      end
      subroutine srot (n,sx,incx,sy,incy,c,s)
c
c     applies a plane rotation.
```

```
c       jack dongarra, linpack, 3/11/78.
c
        real sx(1),sy(1),stemp,c,s
        integer i,incx,incy,ix,iy,n
c
        if(n.le.0)return
        if(incx.eq.1.and.incy.eq.1)go to 20
c
c         code for unequal increments or equal increments not equal
c            to 1
c
        ix = 1
        iy = 1
        if(incx.lt.0)ix = (-n+1)*incx + 1
        if(incy.lt.0)iy = (-n+1)*incy + 1
        do 10 i = 1,n
           stemp = c*sx(ix) + s*sy(iy)
           sy(iy) = c*sy(iy) - s*sx(ix)
           sx(ix) = stemp
           ix = ix + incx
           iy = iy + incy
     10 continue
        return
c
c         code for both increments equal to 1
c
     20 do 30 i = 1,n
           stemp = c*sx(i) + s*sy(i)
           sy(i) = c*sy(i) - s*sx(i)
           sx(i) = stemp
     30 continue
        return
        end
        subroutine srotg(sa,sb,c,s)
c
c       construct givens plane rotation.
c       jack dongarra, linpack, 3/11/78.
c                       modified 9/27/86.
c
        real sa,sb,c,s,roe,scale,r,z
c
        roe = sb
        if( abs(sa) .gt. abs(sb) ) roe = sa
        scale = abs(sa) + abs(sb)
        if( scale .ne. 0.0 ) go to 10
           c = 1.0
           s = 0.0
           r = 0.0
           go to 20
     10 r = scale*sqrt((sa/scale)**2 + (sb/scale)**2)
        r = sign(1.0,roe)*r
        c = sa/r
        s = sb/r
     20 z = s
        if( abs(c) .gt. 0.0 .and. abs(c) .le. s ) z = 1.0/c
        sa = r
        sb = z
        return
        end
        subroutine saxpy(n,sa,sx,incx,sy,incy)
```

```
c
c       constant times a vector plus a vector.
c       uses unrolled loop for increments equal to one.
c       jack dongarra, linpack, 3/11/78.
c
        real sx(1),sy(1),sa
        integer i,incx,incy,ix,iy,m,mp1,n
c
        if(n.le.0)return
        if (sa .eq. 0.0) return
        if(incx.eq.1.and.incy.eq.1)go to 20
c
c          code for unequal increments or equal increments
c            not equal to 1
c
        ix = 1
        iy = 1
        if(incx.lt.0)ix = (-n+1)*incx + 1
        if(incy.lt.0)iy = (-n+1)*incy + 1
        do 10 i = 1,n
          sy(iy) = sy(iy) + sa*sx(ix)
          ix = ix + incx
          iy = iy + incy
   10   continue
        return
c
c          code for both increments equal to 1
c
c
c          clean-up loop
c
   20   m = mod(n,4)
        if( m .eq. 0 ) go to 40
        do 30 i = 1,m
          sy(i) = sy(i) + sa*sx(i)
   30   continue
        if( n .lt. 4 ) return
   40   mp1 = m + 1
        do 50 i = mp1,n,4
          sy(i) = sy(i) + sa*sx(i)
          sy(i + 1) = sy(i + 1) + sa*sx(i + 1)
          sy(i + 2) = sy(i + 2) + sa*sx(i + 2)
          sy(i + 3) = sy(i + 3) + sa*sx(i + 3)
   50   continue
        return
        end
        real function sdot(n,sx,incx,sy,incy)
c
c       forms the dot product of two vectors.
c       uses unrolled loops for increments equal to one.
c       jack dongarra, linpack, 3/11/78.
c
        real sx(1),sy(1),stemp
        integer i,incx,incy,ix,iy,m,mp1,n
c
        stemp = 0.0e0
        sdot = 0.0e0
        if(n.le.0)return
        if(incx.eq.1.and.incy.eq.1)go to 20
c
```

```
c        code for unequal increments or equal increments
c          not equal to 1
c
      ix = 1
      iy = 1
      if(incx.lt.0)ix = (-n+1)*incx + 1
      if(incy.lt.0)iy = (-n+1)*incy + 1
      do 10 i = 1,n
        stemp = stemp + sx(ix)*sy(iy)
        ix = ix + incx
        iy = iy + incy
   10 continue
      sdot = stemp
      return
c
c        code for both increments equal to 1
c
c
c        clean-up loop
c
   20 m = mod(n,5)
      if( m .eq. 0 ) go to 40
      do 30 i = 1,m
        stemp = stemp + sx(i)*sy(i)
   30 continue
      if( n .lt. 5 ) go to 60
   40 mp1 = m + 1
      do 50 i = mp1,n,5
        stemp = stemp + sx(i)*sy(i) + sx(i + 1)*sy(i + 1) +
     *  sx(i + 2)*sy(i + 2) + sx(i + 3)*sy(i + 3) + sx(i + 4)*sy(i + 4)
   50 continue
   60 sdot = stemp
      return
      end
      subroutine sscal(n,sa,sx,incx)
c
c     scales a vector by a constant.
c     uses unrolled loops for increment equal to 1.
c     jack dongarra, linpack, 3/11/78.
c     modified to correct problem with negative increment, 8/21/90.
c
      real sa,sx(1)
      integer i,incx,ix,m,mp1,n
c
      if(n.le.0)return
      if(incx.eq.1)go to 20
c
c        code for increment not equal to 1
c
      ix = 1
      if(incx.lt.0)ix = (-n+1)*incx + 1
      do 10 i = 1,n
        sx(ix) = sa*sx(ix)
        ix = ix + incx
   10 continue
      return
c
c        code for increment equal to 1
c
c
```

```
c       clean-up loop
c
   20 m = mod(n,5)
      if( m .eq. 0 ) go to 40
      do 30 i = 1,m
        sx(i) = sa*sx(i)
   30 continue
      if( n .lt. 5 ) return
   40 mp1 = m + 1
      do 50 i = mp1,n,5
        sx(i) = sa*sx(i)
        sx(i + 1) = sa*sx(i + 1)
        sx(i + 2) = sa*sx(i + 2)
        sx(i + 3) = sa*sx(i + 3)
        sx(i + 4) = sa*sx(i + 4)
   50 continue
      return
      end
      real function snrm2 ( n, sx, incx)
      integer i, incx, ix, j, n, next
      real    sx(1), cutlo, cuthi, hitest, sum, xmax, zero, one
      data    zero, one /0.0e0, 1.0e0/
```

```
c
c     euclidean norm of the n-vector stored in sx() with storage
c     increment incx .
c     if    n .le. 0 return with result = 0.
c     if n .ge. 1 then incx must be .ge. 1
c
c           c.l.lawson, 1978 jan 08
c     modified to correct problem with negative increment, 8/21/90.
c     modified to correct failure to update ix, 1/25/92.
c
c     four phase method     using two built-in constants that are
c     hopefully applicable to all machines.
c         cutlo = maximum of  sqrt(u/eps)  over all known machines.
c         cuthi = minimum of  sqrt(v)      over all known machines.
c     where
c         eps = smallest no. such that eps + 1. .gt. 1.
c         u   = smallest positive no.   (underflow limit)
c         v   = largest  no.            (overflow limit)
c
c     brief outline of algorithm..
c
c     phase 1    scans zero components.
c     move to phase 2 when a component is nonzero and .le. cutlo
c     move to phase 3 when a component is .gt. cutlo
c     move to phase 4 when a component is .ge. cuthi/m
c     where m = n for x() real and m = 2*n for complex.
c
c     values for cutlo and cuthi..
c     from the environmental parameters listed in the imsl converter
c     document the limiting values are as follows..
c     cutlo, s.p.   u/eps = 2**(-102) for honeywell. close seconds are
c                   univac and dec at 2**(-103)
c                   thus cutlo = 2**(-51) = 4.44089e-16
c     cuthi, s.p.   v = 2**127 for univac, honeywell, and dec.
c                   thus cuthi = 2**(63.5) = 1.30438e19
c     cutlo, d.p.   u/eps = 2**(-67) for honeywell and dec.
c                   thus cutlo = 2**(-33.5) = 8.23181d-11
c     cuthi, d.p.   same as s.p.  cuthi = 1.30438d19
```

```
c       data cutlo, cuthi /  8.232d-11,  1.304d19 /
c       data cutlo, cuthi /  4.441e-16,  1.304e19 /
        data cutlo, cuthi /  4.441e-16,  1.304e19 /
c
        if(n .gt. 0) go to 10
           snrm2 = zero
           go to 300
c
   10 assign 30 to next
      sum = zero
      i = 1
      if(incx.lt.0) i = (-n+1)*incx + 1
      ix = 1
c                                                         begin main loop
   20    go to next,(30, 50, 70, 110)
   30 if( abs(sx(i)) .gt. cutlo) go to 85
      assign 50 to next
      xmax = zero
c
c                       phase 1.  sum is zero
c
   50 if( sx(i) .eq. zero) go to 200
      if( abs(sx(i)) .gt. cutlo) go to 85
c
c                       prepare for phase 2.
      assign 70 to next
      go to 105
c
c                       prepare for phase 4.
c
  100 continue
      ix = j
      assign 110 to next
      sum = (sum / sx(i)) / sx(i)
  105 xmax = abs(sx(i))
      go to 115
c
c                       phase 2.  sum is small.
c                                 scale to avoid destructive underflow.
c
   70 if( abs(sx(i)) .gt. cutlo ) go to 75
c
c                       common code for phases 2 and 4.
c                       in phase 4 sum is large.  scale to avoid overflow.
c
  110 if( abs(sx(i)) .le. xmax ) go to 115
         sum = one + sum * (xmax / sx(i))**2
         xmax = abs(sx(i))
         go to 200
c
  115 sum = sum + (sx(i)/xmax)**2
      go to 200
c
c
c                       prepare for phase 3.
c
   75 sum = (sum * xmax) * xmax
c
c
c     for real or d.p. set hitest = cuthi/n
```

```
c        for complex      set hitest = cuthi/(2*n)
c
   85 hitest = cuthi/float( n )
c
c                 phase 3.  sum is mid-range.  no scaling.
c
      do 95 j = ix, n
         if(abs(sx(i)) .ge. hitest) go to 100
         sum = sum + sx(i)**2
         i = i + incx
   95 continue
      snrm2 = sqrt( sum )
      go to 300
c
  200 continue
      ix = ix + 1
      i = i + incx
      if( ix .le. n ) go to 20
c
c                 end of main loop.
c
c                 compute square root and adjust for scaling.
c
      snrm2 = xmax * sqrt(sum)
  300 continue
      return
      end
```

Subroutine bsort

This subroutine is used to sort out the values of the Mahalanobis distance. A buble sort is used to rank order them. More efficient algorithms are available but for the purpose of this application, this algorithm is sufficient.

```
      subroutine bsort(a,n)
c
c  this routine sorts the vector a with dimension n using a bubble sort
c
      dimension a(n)
      write(*,*)'Beginning Sort Procedure'
      do 10 i=1,n 1
      do 20 j=1,n-1
      if(a(j).gt.a(j+1))then
      t=a(j)
      a(j)=a(j+1)
      a(j+1)=t
      end if
20    continue
10    continue
      write(*,*)'Sort Procedure Completed'
      return
      end
```

Subroutine slopma

This routine determines the deriviative of the cumulative distribution (CDF) created by rank ordering the values of the Mahalanobis distance. The derivative, or slope is computed by investigating the nearest 21 points. A linear fit is currently used but the code provides comment cards which can be used to obtain a quadratic fit. If the quadratic fit is desired, the additional sobroutine gausel, which performs a Gaussian elimination with pivoting on the matrix, is included.

```
      subroutine slopma(a,b,n)
c
c   this routine determines the derivative of the distribution
c   function for any value of the mahalanobis distance.  This is
c   done using a quadratic regression on the 20 nearest values
c
c     dimension a(n),b(n),c(n),am(3,3),bm(3),sol(3)
      dimension a(n),b(n)
c
c   the first 10 values take on the slope computed through the
c   linear regression, not quadratic
c
      sy=0.
      sx=0.
      sxy=0.
      sx2=0.
      do 1 i=1,10
      sy=sy+a(i)
      sx=sx+i
      sxy=a(i)*i+sxy
      sx2=sx2+i**2
    1 continue
      if((10.*sxy-sx*sy).eq.0.0)then
      slp=1.e+5
      else
      slp=(10.*sx2-sx**2)/(10.*sxy-sx*sy)
      end if
      do 5 i=1,10
      b(i)=slp
c     c(i)=0.
    5 continue
c
c   repeat the procedure for the last 10 values
c
      sy=0.
      sx=0.
      sxy=0.
      sx2=0.
      do 11 i=n-9,n
      sy=sy+a(i)
      sx=sx+i
      sxy=a(i)*i+sxy
      sx2=sx2+i**2
   11 continue
      if((10.*sxy-sx*sy).eq.0.0)then
      slp=1.e+5
      else
      slp=(10.*sx2-sx**2)/(10.*sxy-sx*sy)
      end if
      do 15 i=n-9,n
      b(i)=slp
c     c(i)=0.
   15 continue
c
c   consider the case in which we are not near the end of the
c   distribution
c
      do 10 i=11,n-10
      sy=0.
```

```
      sx=0.
      sxy=0.
      sx2=0.
      do 20 j=i-10,i+10
      sy=sy+a(j)
      sx=sx+j
      sxy=a(j)*float(j)+sxy
      sx2=sx2+j**2
   20 continue
      if((21.*sxy-sx*sy).eq.0.0)then
      slp=1.e+5
      else
      b(i)=(21.*sx2-sx**2)/(21.*sxy-sx*sy)
      end if
c
c     the following cards, corresponding to a quadratic fit
c     are commented out - a linear fit is used
c
c     sy=0.
c     sx=0.
c     sxy=0.
c     sx2y=0.
c     sx2=0.
c     sx3=0.
c     sx4=0.
c     do 20 j=i-10,i+10
c     sy=sy+a(j)
c     sx=sx+j
c     sxy=sxy+j*a(j)
c     sx2y=sx2y+j**2*a(j)
c     sx2=sx2+j**2
c     sx3=sx3+j**3
c     sx4=sx4+j**4
c  20 continue
c     am(1,1)=21.
c     am(2,1)=sx
c     am(1,2)=sx
c     am(1,3)=sx2
c     am(3,1)=sx2
c     am(2,2)=sx2
c     am(2,3)=sx3
c     am(3,2)=sx3
c     am(3,3)=sx4
c     bm(1)=sy
c     bm(2)=sxy
c     bm(3)=sx2y
c     call gausel(am,bm,sol)
c     b(i)=sol(2)
c     c(i)=sol(3)*2.
   10 continue
      return
      end
      subroutine gausel(am,bm,sol)
c
c     this routine solves a 3X3 matrix using Gaussian elimination with pivoting
c
      dimension am(3,3),bm(3),sol(3)
c
c     pivot to obtain largest value for am(1,1)
c
```

```
        do 10 i=2,3
        if(am(i,1).gt.am(1,1))then
        do 15 j=1,3
        t=am(i,j)
        am(i,j)=am(1,j)
        am(1,j)=t
    15  continue
        t=bm(i)
        bm(i)=bm(1)
        bm(1)=t
        end if
c
c   completed first pivot
c
    10  continue
c
c   subtract out multiple of first row from others
c
        do 20 i=2,3
        do 25 j=2,3
        am(i,j)=am(i,j)-am(i,1)/am(1,1)*am(1,j)
    25  continue
        bm(i)=bm(i)-am(i,1)/am(1,1)*bm(1)
    20  continue
        am(2,1)=0.
        am(3,1)=0.
c
c   second pivot
c
        if(am(2,2).lt.am(3,2))then
        do 30 i=2,3
        t=am(2,i)
        am(2,i)=am(3,i)
        am(3,i)=t
    30  continue
        t=bm(2)
        bm(2)=bm(3)
        bm(3)=t
        end if
c
c   completed second pivot
c
        am(3,3)=am(3,3)-am(3,2)/am(2,2)*am(2,3)
        bm(3)=bm(3)-am(3,2)/am(2,2)*bm(2)
c
c   forward elimination completed
c
c   begin backward substitution
c
        sol(3)=bm(3)/am(3,3)
        sol(2)=(bm(2)-am(2,3)*sol(3))/am(2,2)
        sol(1)=(bm(1)-am(1,2)*sol(2)-am(1,3)*sol(3))/am(1,1)
c
c   solution completed
c
        return
        end
```

YULE WALKER SUBROUTINE

SUBROUTINE FOR DETERMINING THE AUTOCORRELATION COEFFICIENTS

```
      Subroutine yw(a,P,scr,C,ndim,ndim2)
c
c  This program determines the autoregressive coefficients
c  using the Yule Walker equations
c
c  Variables in:
c  a      - the lag n correlation
c           a(1) corresponds to zero lag
c  P      - the matrix which is constructed from the
c           autocorrelation parameters
c  scr    - a scratch matrix
c  C      - on input, the column vector C;
c           on return, the resulting AR parameters
c  ndim   - the order of the model requested
c  ndim2  - the leading dimension of the amat matrix
c
      dimension a(ndim),P(ndim2,ndim),scr(ndim),C(ndim)
c
c  set up the P matrix
c
      do 10 i=1,ndim
   10 C(i)=a(i+1)
      do 20 i=1,ndim
      do 30 j=1,ndim
      P(i,j)=a(abs(i-j)+1)
   30 continue
   20 continue
c
c  solve the equation Pb=C for b; store in vector C
c
      call spoco(P,ndim2,ndim,rcond,scr,info)
      if(info.ne.0) go to 80
      t=1.0+rcond
      if(t.eq.1.0)go to 90
      call sposl(P,ndim2,ndim,C)
      return
   80 write(*,89)
   89 format(32H Matrix is not positive definite)
      stop
   90 write(*,99)
   99 format(' Matrix is ill conditioned')
      end
      subroutine spoco(a,lda,n,rcond,z,info)
      integer lda,n,info
      real a(lda,1),z(1)
      real rcond
```

```
c
c      spoco factors a real symmetric positive definite matrix
c      and estimates the condition of the matrix.
c
c      if rcond is not needed, spofa is slightly faster.
c      to solve  a*x = b , follow spoco by sposl.
c      to compute  inverse(a)*c , follow spoco by sposl.
c      to compute  determinant(a) , follow spoco by spodi.
c      to compute  inverse(a) , follow spoco by spodi.
c
c      on entry
c
c         a       real(lda, n)
c                 the symmetric matrix to be factored.  only the
c                 diagonal and upper triangle are used.c
c         lda     integer
c                 the leading dimension of the array  a .
c
c         n       integer
c                 the order of the matrix  a .
c
c      on return
c
c         a       an upper triangular matrix  r  so that  a = trans(r)*r
c                 where  trans(r)  is the transpose.
c                 the strict lower triangle is unaltered.
c                 if  info .ne. 0 , the factorization is not complete.
c
c         rcond   real
c                 an estimate of the reciprocal condition of  a .
c                 for the system  a*x = b , relative perturbations
c                 in  a  and  b  of size  epsilon  may cause
c                 relative perturbations in  x  of size  epsilon/rcond .
c                 if  rcond  is so small that the logical expression
c                            1.0 + rcond .eq. 1.0
c                 is true, then  a  may be singular to working
c                 precision.  in particular,  rcond  is zero  if
c                 exact singularity is detected or the estimate
c                 underflows.  if info .ne. 0 , rcond is unchanged.
c
c         z       real(n)
c                 a work vector whose contents are usually unimportant.
c                 if  a  is close to a singular matrix, then  z  is
c                 an approximate null vector in the sense that
c                 norm(a*z) = rcond*norm(a)*norm(z) .
c                 if  info .ne. 0 , z  is unchanged.
```

```
c
c         info    integer
c                 = 0  for normal return.
c                 = k  signals an error condition. the leading minor
c                      of order  k  is not positive definite.
c
c      linpack. this version dated 08/14/78 .
c      cleve moler, university of new mexico, argonne national lab.
c
c      subroutines and functions
c
c      linpack spofa
c      blas saxpy,sdot,sscal,sasum
c      fortran abs,amax1,real,sign
c
c      internal variables
c
       real sdot,ek,t,wk,wkm
       real anorm,s,sasum,sm,ynorm
       integer i,j,jm1,k,kb,kp1
c
c
c      find norm of a using only upper half
c
       do 30 j = 1, n
          z(j) = sasum(j,a(1,j),1)
          jm1 = j - 1
          if (jm1 .lt. 1) go to 20
          do 10 i = 1, jm
             z(i) = z(i) + abs(a(i,j))
   10     continue
   20     continue
   30 continue
       anorm = 0.0e0
       do 40 j = 1, n
          anorm = amax1(anorm,z(j))
   40 continue
c
c      factor
c
       call spofa(a,lda,n,info)
       if (info .ne. 0) go to 180
c
c         rcond = 1/(norm(a)*(estimate of norm(inverse(a)))) .
c         estimate = norm(z)/norm(y) where a*z = y and a*y = e .
c         the components of e are chosen to cause maximum local
```

```
c           growth in the elements of w  where  trans(r)*w = e .
c           the vectors are frequently rescaled to avoid overflow.
c
c       solve trans(r)*w = e
c
        ek = 1.0e0
        do 50 j = 1, n
            z(j) = 0.0e0
50      continue
        do 110 k = 1, n
            if (z(k) .ne. 0.0e0) ek = sign(ek,-z(k))
            if (abs(ek-z(k)) .le. a(k,k)) go to 60
                s = a(k,k)/abs(ek-z(k))
                call sscal(n,s,z,1)
                ek = s*ek
60          continue
            wk = ek - z(k)
            wkm = -ek - z(k)
            s = abs(wk)
            sm = abs(wkm)
            wk = wk/a(k,k)
            wkm = wkm/a(k,k)
            kp1 = k + 1
            if (kp1 .gt. n) go to 100
                do 70 j = kp1, n
                    sm = sm + abs(z(j)+wkm*a(k,j))
                    z(j) = z(j) + wk*a(k,j)
                    s = s + abs(z(j))
70              continue
                if (s .ge. sm) go to 90
                    t = wkm - wk
                    wk = wkm
                    do 80 j = kp1, n
                        z(j) = z(j) + t*a(k,j)
80                  continue
90              continue
100         continue
            z(k) = wk
110     continue
        s = 1.0e0/sasum(n,z,1)
        call sscal(n,s,z,1)
c
c       solve r*y = w
c
        do 130 kb = 1, n
            k = n + 1 - kb
```

```
              if (abs(z(k)) .le. a(k,k)) go to 120
                 s = a(k,k)/abs(z(k))
                 call sscal(n,s,z,1)
       120    continue
              z(k) = z(k)/a(k,k)
              t = -z(k)
              call saxpy(k-1,t,a(1,k),1,z(1),1)
       130    continue
              s = 1.0e0/sasum(n,z,1)
              call sscal(n,s,z,1)
c
              ynorm = 1.0e0
c
c        solve trans(r)*v = y
c
              do 150 k = 1, n
                 z(k) = z(k) - sdot(k-1,a(1,k),1,z(1),1)
                 if (abs(z(k)) .le. a(k,k)) go to 140
                    s = a(k,k)/abs(z(k))
                    call sscal(n,s,z,1)
                    ynorm = s*ynorm
       140        continue
                 z(k) = z(k)/a(k,k)
       150    continue
              s = 1.0e0/sasum(n,z,1)
              call sscal(n,s,z,1)
              ynorm = s*ynorm
c
c        solve r*z = v
c
              do 170 kb = 1, n
                 k = n + 1 - kb
                 if (abs(z(k)) .le. a(k,k)) go to 160
                    s = a(k,k)/abs(z(k))
                    call sscal(n,s,z,1)
                    ynorm = s*ynorm
       160        continue
                 z(k) = z(k)/a(k,k)
                 t = -z(k)
                 call saxpy(k-1,t,a(1,k),1,z(1),1)
       170    continue
c        make znorm = 1.0
              s = 1.0e0/sasum(n,z,1)
              call sscal(n,s,z,1)
              ynorm = s*ynorm
c
```

```
      if (anorm .ne. 0.0e0) rcond = ynorm/anorm
      if (anorm .eq. 0.0e0) rcond = 0.0e0
  180 continue
      return
      end
      subroutine spofa(a,lda,n,info)
      integer lda,n,info
      real a(lda,1)
c
c     spofa factors a real symmetric positive definite matrix.
c
c     spofa is usually called by spoco, but it can be called
c     directly with a saving in time if rcond is not needed.
c     (time for spoco) = (1 + 18/n)*(time for spofa) .
c
c     on entry
c
c        a       real(lda, n)
c                the symmetric matrix to be factored.  only the
c                diagonal and upper triangle are used.
c
c        lda     integer
c                the leading dimension of the array  a .
c
c        n       integer
c                the order of the matrix  a .
c
c     on return
c
c        a       an upper triangular matrix  r  so that  a = trans(r)*r
c                where  trans(r)  is the transpose.
c                the strict lower triangle is unaltered.
c                if  info .ne. 0 , the factorization is not complete.
c
c        info    integer
c                = 0  for normal return.
c                = k  signals an error condition.  the leading minor
c                     of order  k  is not positive definite.
c
c     linpack.  this version dated 08/14/78 .
c     cleve moler, university of new mexico, argonne national lab.
c
c     subroutines and functions
c
c     blas sdot
c     fortran sqrt
```

```
c
c     internal variables
c
      real sdot,t
      real s
      integer j,jm1,k
c     begin block with ...exits to 40
c
c
c
         do 30 j = 1, n
            info = j
            s = 0.0e0
            jm1 = j - 1
            if (jm1 .lt. 1) go to 20
            do 10 k = 1, jm1
               t = a(k,j) - sdot(k-1,a(1,k),1,a(1,j),1)
               t = t/a(k,k)
               a(k,j) = t
               s = s + t*t
   10       continue
   20       continue
            s = a(j,j) - s
c     ......exit
            if (s .le. 0.0e0) go to 40
            a(j,j) = sqrt(s)
   30    continue
         info = 0
   40 continue
      return
      end
      real function sdot(n,sx,incx,sy,incy)
c
c     forms the dot product of two vectors.
c     uses unrolled loops for increments equal to one.
c     jack dongarra, linpack, 3/11/78.
c
      real sx(1),sy(1),stemp
      integer i,incx,incy,ix,iy,m,mp1,n
c
      stemp = 0.0e0
      sdot = 0.0e0
      if(n.le.0)return
      if(incx.eq.1.and.incy.eq.1)go to 20
c
c        code for unequal increments or equal increments
c          not equal to 1
```

```
c
      ix = 1
      iy = 1
      if(incx.lt.0)ix = (-n+1)*incx + 1
      if(incy.lt.0)iy = (-n+1)*incy + 1
      do 10 i = 1,n
        stemp = stemp + sx(ix)*sy(iy)
        ix = ix + incx
        iy = iy + incy
   10 continue
      sdot = stemp
      return
c
c        code for both increments equal to 1
c
c
c        clean-up loop
c
   20 m = mod(n,5)
      if( m .eq. 0 ) go to 40
      do 30 i = 1,m
        stemp = stemp + sx(i)*sy(i)
   30 continue
      if( n .lt. 5 ) go to 60
   40 mp1 = m + 1
      do 50 i = mp1,n,5
        stemp = stemp + sx(i)*sy(i) + sx(i + 1)*sy(i + 1) +
     *   sx(i + 2)*sy(i + 2) + sx(i + 3)*sy(i + 3) + sx(i + 4)*sy(i + 4)
   50 continue
   60 sdot = stemp
      return
      end
      subroutine saxpy(n,sa,sx,incx,sy,incy)
c
c     constant times a vector plus a vector.
c     uses unrolled loop for increments equal to one.
c     jack dongarra, linpack, 3/11/78.
c
      real sx(1),sy(1),sa
      integer i,incx,incy,ix,iy,m,mp1,n
c
      if(n.le.0)return
      if (sa .eq. 0.0) return
      if(incx.eq.1.and.incy.eq.1)go to 20
c
c        code for unequal increments or equal increments
```

```
c         not equal to 1
c
      ix = 1
      iy = 1
      if(incx.lt.0)ix = (-n+1)*incx + 1
      if(incy.lt.0)iy = (-n+1)*incy + 1
      do 10 i = 1,n
        sy(iy) = sy(iy) + sa*sx(ix)
        ix = ix + incx
        iy = iy + incy
   10 continue
      return
c
c        code for both increments equal to 1
c
c
c        clean-up loop
c
   20 m = mod(n,4)
      if( m .eq. 0 ) go to 40
      do 30 i = 1,m
        sy(i) = sy(i) + sa*sx(i)
   30 continue
      if( n .lt. 4 ) return
   40 mp1 = m + 1
      do 50 i = mp1,n,4
        sy(i) = sy(i) + sa*sx(i)
        sy(i + 1) = sy(i + 1) + sa*sx(i + 1)
        sy(i + 2) = sy(i + 2) + sa*sx(i + 2)
        sy(i + 3) = sy(i + 3) + sa*sx(i + 3)
   50 continue
      return
      end
      subroutine sscal(n,sa,sx,incx)
c
c     scales a vector by a constant.
c     uses unrolled loops for increment equal to 1.
c     jack dongarra, linpack, 3/11/78.
c     modified to correct problem with negative increment, 8/21/90.
c
      real sa,sx(1)
      integer i,incx,ix,m,mp1,n
c
      if(n.le.0)return
      if(incx.eq.1)go to 20
c
```

```
c          code for increment not equal to 1
c
      ix = 1
      if(incx.lt.0)ix = (-n+1)*incx + 1
      do 10 i = 1,n
        sx(ix) = sa*sx(ix)
        ix = ix + incx
   10 continue
      return
c
c          code for increment equal to 1
c
c
c          clean-up loop
c
   20 m = mod(n,5)
      if( m .eq. 0 ) go to 40
      do 30 i = 1,m
        sx(i) = sa*sx(i)
   30 continue
      if( n .lt. 5 ) return
   40 mp1 = m + 1
      do 50 i = mp1,n,5
        sx(i) = sa*sx(i)
        sx(i + 1) = sa*sx(i + 1)
        sx(i + 2) = sa*sx(i + 2)
        sx(i + 3) = sa*sx(i + 3)
        sx(i + 4) = sa*sx(i + 4)
   50 continue
      return
      end
      real function sasum(n,sx,incx)
c
c     takes the sum of the absolute values.
c     uses unrolled loops for increment equal to one.
c     jack dongarra, linpack, 3/11/78.
c     modified to correct problem with negative increment, 8/21/90.
c
      real sx(1),stemp
      integer i,incx,ix,m,mp1,n
c
      sasum = 0.0e0
      stemp = 0.0e0
      if(n.le.0)return
      if(incx.eq.1)go to 20
c
```

```
c         code for increment not equal to 1
c
      ix = 1
      if(incx.lt.0)ix = (-n+1)*incx + 1
      do 10 i = 1,n
        stemp = stemp + abs(sx(ix))
        ix = ix + incx
   10 continue
      sasum = stemp
      return
c
c         code for increment equal to 1
c
c
c         clean-up loop
c
   20 m = mod(n,6)
      if( m .eq. 0 ) go to 40
      do 30 i = 1,m
        stemp = stemp + abs(sx(i))
   30 continue
      if( n .lt. 6 ) go to 60
   40 mp1 = m + 1
      do 50 i = mp1,n,6
        stemp = stemp + abs(sx(i)) + abs(sx(i + 1)) + abs(sx(i + 2))
     *  + abs(sx(i + 3)) + abs(sx(i + 4)) + abs(sx(i + 5))
   50 continue
   60 sasum = stemp
      return
      end
      subroutine sposl(a,lda,n,b)
      integer lda,n
      real a(lda,1),b(1)
c
c     sposl solves the real symmetric positive definite system
c     a * x = b
c     using the factors computed by spoco or spofa.
c
c     on entry
c
c        a       real(lda, n)
c                the output from spoco or spofa.
c
c        lda     integer
c                the leading dimension of the array a .
c
```

```
c        n        integer
c                 the order of the matrix  a .
c
c        b        real(n)
c                 the right hand side vector.
c
c     on return
c
c        b        the solution vector  x .
c
c     error condition
c
c        a division by zero will occur if the input factor contains
c        a zero on the diagonal. technically this indicates
c        singularity but it is usually caused by improper subroutine
c        arguments. it will not occur if the subroutines are called
c        correctly and  info .eq. 0 .
c
c     to compute  inverse(a) * c  where  c  is a matrix
c     with  p  columns
c           call spoco(a,lda,n,rcond,z,info)
c           if (rcond is too small .or. info .ne. 0) go to ...
c           do 10 j = 1, p
c              call sposl(a,lda,n,c(1,j))
c        10 continue
c
c     linpack. this version dated 08/14/78 .
c     cleve moler, university of new mexico, argonne national lab.
c
c     subroutines and functions
c
c     blas saxpy,sdot
c
c     internal variables
c
      real sdot,t
      integer k,kb
c
c     solve trans(r)*y = b
c
      do 10 k = 1, n
         t = sdot(k-1,a(1,k),1,b(1),1)
         b(k) = (b(k) - t)/a(k,k)
   10 continue
c
c     solve r*x = y
```

```
c
      do 20 kb = 1, n
         k = n + 1 - kb
         b(k) = b(k)/a(k,k)
         t = -b(k)
         call saxpy(k-1,t,a(1,k),1,b(1),1)
   20 continue
      return
      end
```

Once the autoregressive coefficients have been found, the expected value can be determined using the following coding:

```
c
c   This code reads in autoregressive coefficients and based on these
c   calculates the expected value of the variable
c
      dimension a(500),data(10000)
      character*60 afile
      read(8)ndim,nskip,amean
      read(8)(a(i),i=1,ndim)
      write(*,*)' What is the name of the file containing the data?'
      read(*,100)afile
  100 format(a60)
      open(unit=7,file=afile,status='old')
      write(*,*)' How many points would you like to skip in the file?'
      read(*,*)nskp
      datps=0.
      datpss=0.
      errs=0.
      errss=0.
      if(nskip.gt.0)then
      do 10 i=1,nskp
      read(7,*)datnew
   10 continue
      end if
c
c   initialize the data array to zero
c
      do 20 i=1,nskip*ndim
      data(i)=0.0
   20 continue
c
c   determine the number of points to be tested
c
      write(*,*)' How many points are to be processed?'
      read(*,*)npts
      do 30 l=1,npts
      read(7,*)datnew
      datp=datnew-amean
      datps=datp+datps
      datpss=datp**2+datpss
      pred=0.
      do 40 i=1,ndim
      pred=pred+a(i)*data(i*nskip)
   40 continue
```

```
      predp=pred+amean
      do 50 i=ndim*nskip,2,-1
      data(i)=data(i-1)
 50   continue
      data(1)=datp
      err=pred-datp
      write(9,*)datnew,predp,err
      errs=errs+err
      errss=errss+err**2
 30   continue
c
c   compute the standard deviation of the signal and of the predicted
c   minus observed values
      stde=sqrt(errss/float(npts)-(errs/float(npts))**2)
      stdd=sqrt(datpss/float(npts)-(datps/float(npts))**2)
      write(*,*)stde,stdd
      stop
      end
```

The expected value is subtracted from the measured value to yield the "correlation reduced" value.

The Fourier components can be determined the FFT routine coded below (this is a standard routine):

FFT SUBROUTINE

THIS IS A STANDARD FACT FOURIER TRANSFORM PROGRAM USED TO CALCULATE THE FOURIER COMPONENTS

```fortran
      program fft
c     This code performs a fast fourier transform on a set of
c     data
c
      character*40 afile
      implicit real*8 (a-h,o-z)
      dimension xreal(100000),ximag(100000),xinp(100000)
      write(*,*)' How many data points are there?'
      read(*,*)ndata
      do 20 i=1,100
      if(2**i.eq.ndata)go to 25
  20  continue
  25  nd2=i
      write(*,*)' What is the name of the file containing the'
      write(*,*)' data points?'
      read(*,100)afile
 100  format(a40)
      open(unit=7,file=afile,status='old')
      read(7,*)(xinp(i),i=1,ndata)
      do 10 i=1,ndata
      xreal(i)=xinp(i)
  10  continue
      ndata2=ndata/2
      nd2m1=nd2-1
      k=0
      do 30 l=1,nd2
 105  do 40 i=1,ndata2
      j=k/2**nd2m1
      call bitrev(ibitr,j,nd2)
      arg=6.28318530717959D0*dfloat(ibitr)/dfloat(ndata)
      c=dcos(arg)
      s=dsin(arg)
      k1=k+1
      kin2=k1+ndata2
      treal=xreal(kin2)*c+ximag(kin2)*s
      timag=ximag(kin2)*c+xreal(kin2)*s
      xreal(kin2)=xreal(k1)-treal
      ximag(kin2)=ximag(k1)-timag
      xreal(k1)=xreal(k1)+treal
      ximag(k1)=ximag(k1)+timag
      k=k+1
  40  continue
      k=k+ndata2
      if(k.lt.ndata)go to 105
```

```
      k=0
      nd2m1=nd2m1-1
      ndata2=ndata2/2
30 continue
      do 50 k=1,ndata
      j=k-1
      call bitrev(ibitr,j,nd2)
      i=ibitr+1
      if(i.le.k)go to 50
      treal=xreal(k)
      timag=ximag(k)
      xreal(k)=xreal(i)
      ximag(k)=ximag(i)
      xreal(i)=treal
      ximag(i)=timag
50 continue
      do 60 i=1,ndata
      write(8,103)i,xreal(i),ximag(i)
60 continue
103 format(1x,i3,1x,2d14.6)
      stop
      end
      subroutine bitrev(ibitr,j,nd2)
      j1=j
      ibitr=0
      do 10 i1=1,nd2
      j2=j1/2
      ibitr=ibitr*2+(j1-2*j2)
      j1=j2
10 continue
      return
      end
```

What is claimed is:

1. A system for surveillance of an industrial process to assess at least one of an operational state of the industrial process and the operational state of sensors monitoring the process, comprising:

at least one sensor means for sensing raw data information from the industrial process corresponding to the operational state of the industrial process;

means for converting the raw data information to computer data;

computer means for receiving the computer data and generating sensor data analyzable by the computer means;

computer software means executable by the computer means for carrying out manipulation of the sensor data, said computer software means including, (a) means for removing serial correlation information between any of the means for sensing raw data information and (b) means for calculating Mahalanobis distribution data and determining a statistical deviation from previously accumulated training data for the industrial process, wherein the training data is characteristic of raw data information with the means for sensing operating normally and the industrial process properly functioning; and means for applying a probability ratio test to the Mahalanobis distribution data to determine alarm conditions for said industrial process and said sensor means.

2. The system as defined in claim 1 wherein said computer software means includes means for assuring the auto- and cross-correlation structure data are unchanged relative to an earlier time.

3. The system as defined in claim 1 wherein said means for sensing comprises a plurality of individual sensors.

4. The system as defined in claim 1 wherein said means for removing serial correlation comprises at least one of (1) means for Fourier filtering the raw data information, (2) means for performing autoregressive filtering of the raw data information or (3) means for passing the raw data information without filtering.

5. The system as defined in claim 4 wherein said means for Fourier filtering comprises a fast Fourier transformation software package.

6. The system as defined in claim 4 wherein low frequency components are filtered by the means for Fourier filtering and the high frequency components are removed by the means for performing autoregressive filtering.

7. The system as defined in claim 1 wherein said means for applying a probability ratio test further comprises means for performing a sequential probability ratio test.

8. The system as defined in claim 1 wherein said means for calculating Mahalanobis distribution data includes means for calculating Mahalanobis distributions for a plurality of combinations in which each one of said means for sensing is masked stepwise.

9. The system as defined in claim 8 wherein the Mahalanobis distribution data are recalculated at later times by the means for calculating Mahalanobis data, thereby ensuring no significant time drift of the raw data information output from the means for sensing.

10. The system as defined in claim 1 wherein said means for removing serial correlation comprises means for superpositioning and manipulating the raw data information and derivatives thereof characteristic of one of Fourier filtered data and autoregressively filtered data.

11. The system as defined in claim 10 wherein the means for removing serial correlation by autoregression includes means for skipping selected ones of the raw data information.

12. The system as defined in claim 10 wherein the means for removing serial correlation by autoregression includes recalculation means for comparing newly calculated filtered data with previously calculated filtered data.

13. The system as defined in claim 1 wherein said means for calculating Mahalanobis distribution data includes means for transforming principal components.

14. The system as defined in claim 1 wherein the means for applying a probability ratio test includes means for specifying an offset for the Mahalanobis distribution data characteristic of abnormal operation of the industrial process.

15. The system as defined in claim 1 wherein the probability ratio test comprises forming a ratio:

$$P_n = \frac{\text{probability of a Mahalanobis distance sequence for no abnormality}}{\text{probability of Mahalanobis distance sequence for abnormality}}$$

where if $P_n > B$ implies no abnormality and if $P_n < A$ implies abnormality where A and B are assigned values for the particular said industrial process.

16. The system as defined in claim 15 wherein said system includes means for identifying a faulty one of said means for sensing, said means for identifying comprising means for masking sequentially each of said means for sensing and comparing the Mahalanobis distribution data, thereby obtaining $P_n < A$ when the faulty one of said means for sensing is unmasked.

17. The system as defined in claim 16 wherein said means for identifying further includes means for masking sequentially more than one of said means for sensing, thereby enabling identification of more than one faulty one of said means for sensing.

18. A method for performing surveillance of an industrial process using industrial sensors to assess at least one of an operational state of the industrial process and viability of the sensors, comprising the steps of:

sensing raw data information from the industrial process using a plurality of sensors;

converting the raw data information to computer data and outputting the computer data to a computer;

generating analyzable sensor data for the computer;

executing computer software using the computer to remove serial correlation information present for each sensor alone between the raw data information accumulated by each of the sensors at different times;

accumulating training data for the industrial process and the sensors characteristic of raw data information known to be representative of a properly functioning sensor and industrial process;

further executing the computer software to calculate a statistical deviation from the training data by determining Mahalanobis distribution data for both the raw data information and the training data; and applying a probability ratio test to determine alarm conditions for abnormal states of the industrial process and the sensors.

19. The method as defined in claim 18 wherein the steps of removing serial correlation information comprises performing at least one of the step of Fourier filtering and autoregressively filtering the raw data information.

20. The method as defined in claim 18 further including the steps of performing a sequential probability ratio test after applying a probability ratio test of the Mahalanobis distribution data.

21. The method as defined in claim 18 wherein the step of determining the Mahalanobis distribution data includes sequentially calculating distribution data for multiple situations in which each one of said sensors is masked sequentially.

22. The method as defined in claim 18 wherein the Mahalanobis distribution data is recalculated periodically to ensure continuity with previous calculations.

23. The method as defined in claim 18 wherein the industrial process is selected from the group consisting of a nuclear power plant process, a fossil power plant process, an operating automobile, an operating aircraft, an operating ship, a water and waste treatment process, a pumping station process, an operating petroleum fluid pipeline, a chemical plant process and a biomedical process.

24. The method as defined in claim 18 wherein said step of executing computer software includes segmenting the raw data information into linear segments thereby characterizing nonlinear variable behavior as a plurality of segments of linear behavior.

25. The method as defined in claim 18 wherein the step of executing computer software includes the step of time averaging over slowly changing portions of the raw data information.

26. The method as defined in claim 18 wherein the step of executing computer software includes skipping analysis of selected portions of the raw data information over slowly changing portions of the raw data information.

27. The method as defined in claim 18 further including the step of generating an alarm for at least one of an automated response by a device operating the industrial process or a manual response by an operator.

* * * * *